United States Patent

Bernhard

[11] Patent Number: 5,309,694
[45] Date of Patent: May 10, 1994

[54] DEVICE FOR USE WITH A CLOSURE MAGAZINE FOR INTRODUCING CLOSURES INTO A CLOSURE CHANNEL

[75] Inventor: Herbert Bernhard, Wolfsheim, Fed. Rep. of Germany

[73] Assignee: Seitz Enzinger Noll Machinenbau Aktiengesellschaft, Mannheim, Fed. Rep. of Germany

[21] Appl. No.: 927,171

[22] Filed: Aug. 7, 1992

[30] Foreign Application Priority Data

Aug. 8, 1991 [DE] Fed. Rep. of Germany ....... 4126193
Sep. 16, 1991 [DE] Fed. Rep. of Germany ....... 4130719
Dec. 23, 1991 [DE] Fed. Rep. of Germany ....... 4142785

[51] Int. Cl.$^5$ .................... B65G 47/24; B65G 47/80
[52] U.S. Cl. ................................ 53/64; 53/314
[58] Field of Search ............ 53/64, 68, 505, 313, 53/314, 315, 310, 306; 222/169

[56] References Cited

U.S. PATENT DOCUMENTS 2,658,654 11/1953 Schweizer ................. 53/314 X
2,835,963 5/1958 Drennan et al. ............ 53/314 X
2,836,947 6/1958 Day et al. .................. 53/314
4,006,812 2/1977 Everett et al. ............. 198/347

FOREIGN PATENT DOCUMENTS 3049525 12/1980 Fed. Rep. of Germany.

Primary Examiner—James F. Coan
Attorney, Agent, or Firm—Robert W. Becker & Associates

[57] ABSTRACT

A device for use with a closure magazine of a closing or capping machine for introducing crown corks or similar closures into a closure channel from a chamber that accommodates a plurality of such closures. The closures are conducted in the closure channel in a successive manner and in single file. At least one magnetic conveyor is provided at a transition that is formed partially in the chamber and partially in an entry region of the closure channel. At this transition, the conveyor exerts a conveying effect upon the closures in a first conveying direction from the chamber into the closure channel.

36 Claims, 13 Drawing Sheets

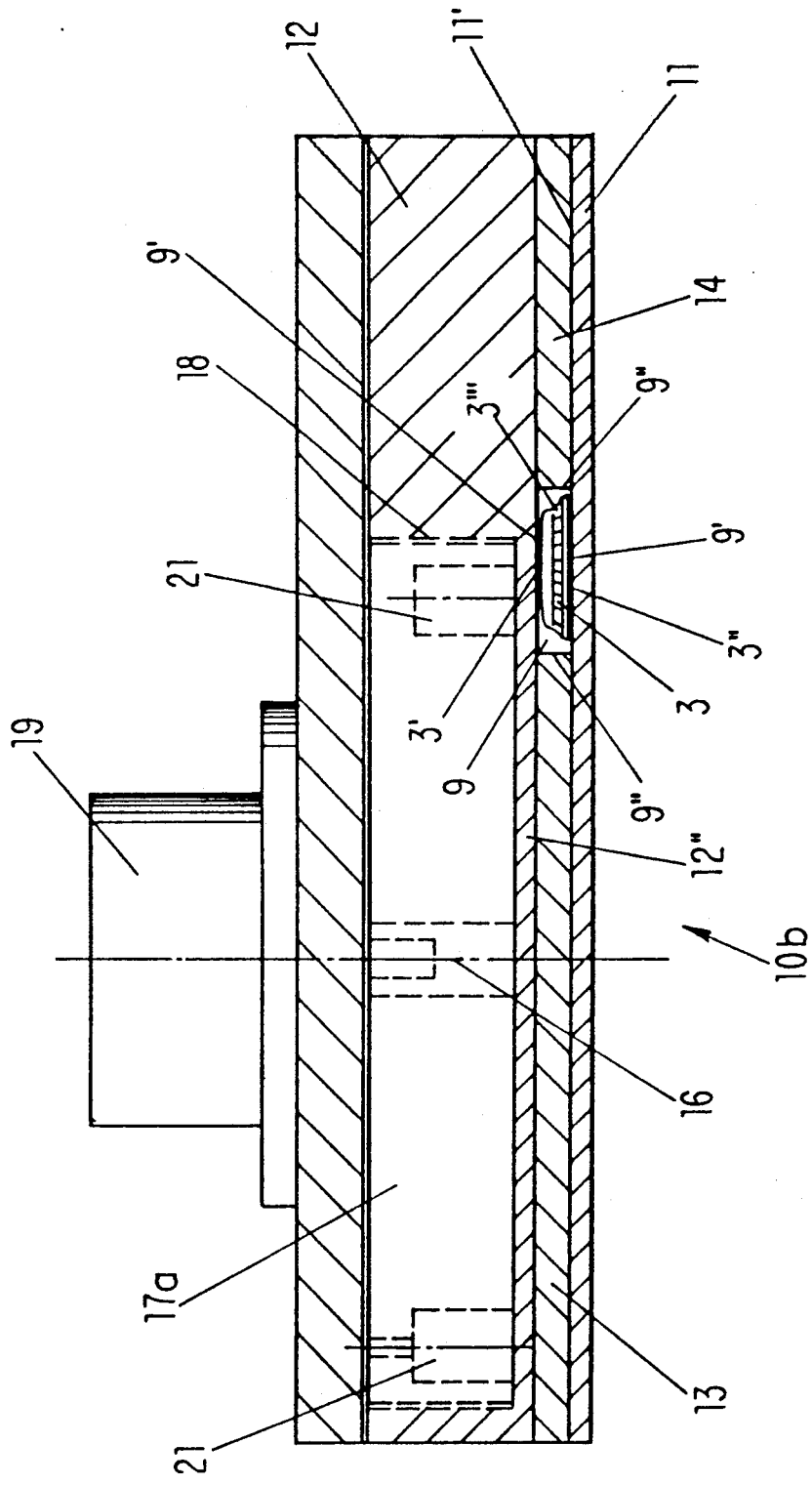

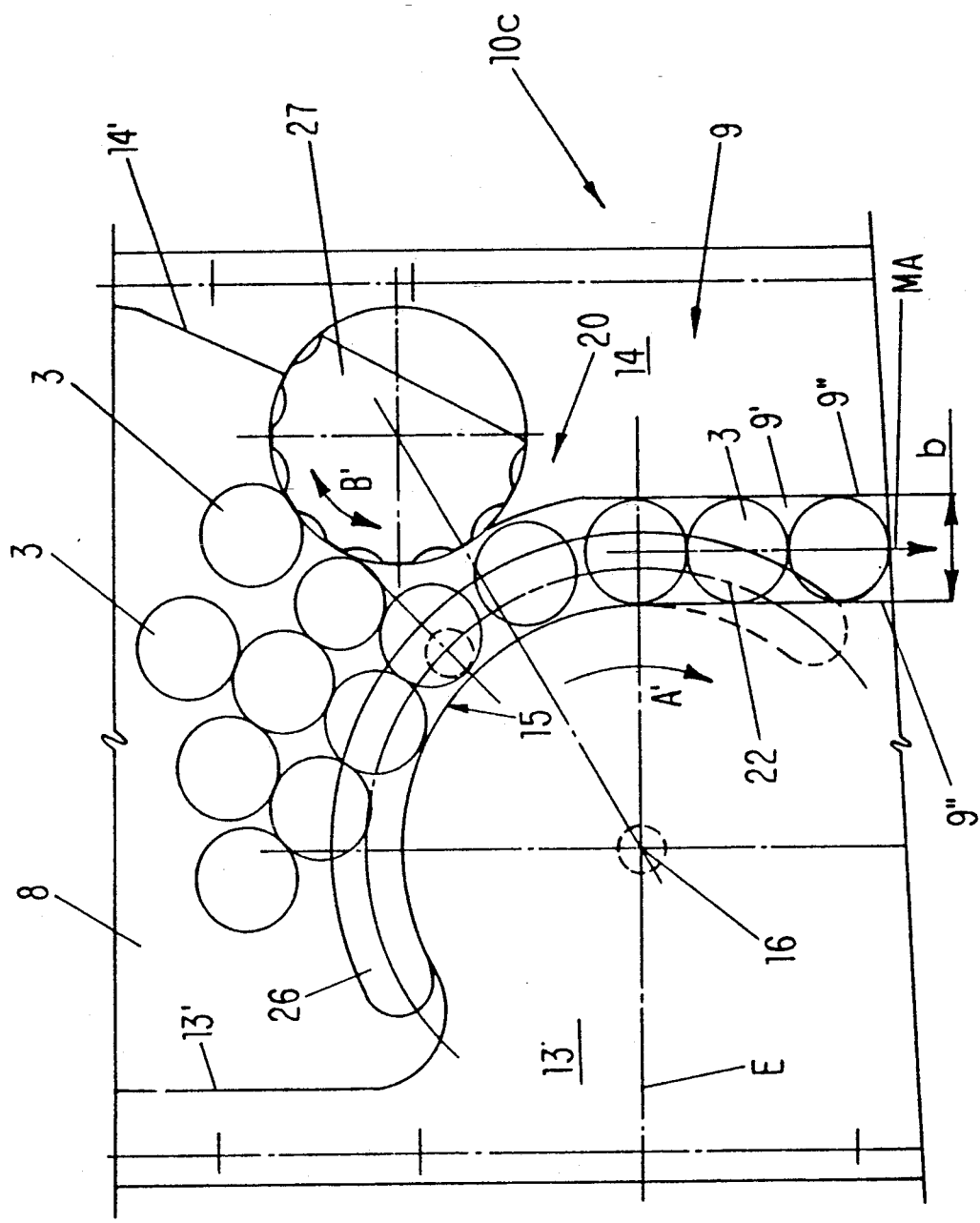

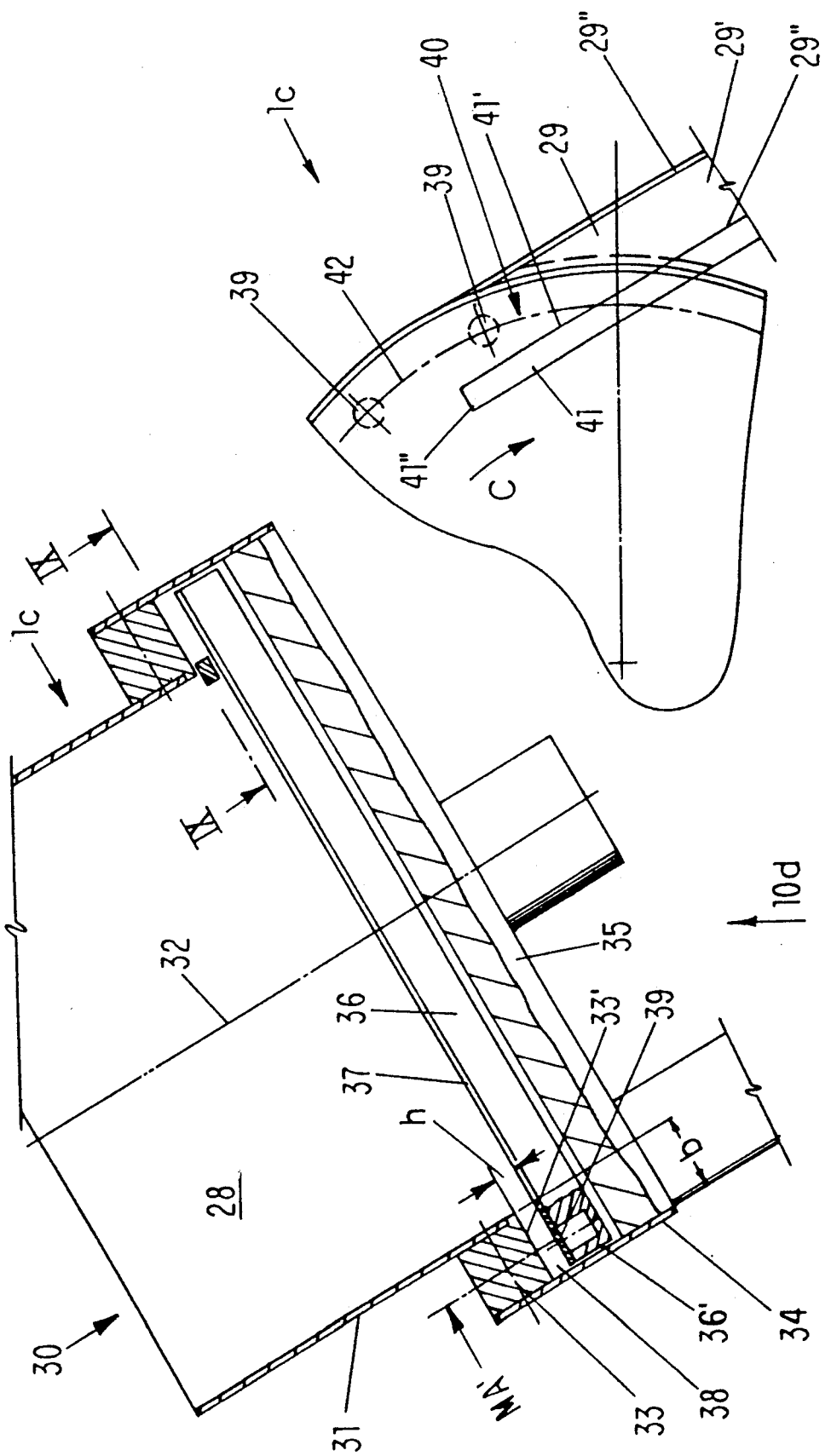

DEVICE FOR USE WITH A CLOSURE MAGAZINE FOR INTRODUCING CLOSURES INTO A CLOSURE CHANNEL

BACKGROUND OF THE INVENTION

The present invention relates to a device, for use with a closure magazine of a closing or capping machine, for introducing closures or caps into a closure channel from a chamber that accommodates a plurality of such closures, with the closures being crown corks of ferromagnetic material and having a cap-like shape with a closed side and an open side, and with the closures being conducted in the closure channel in a successive manner and in single file.

Various types of closure magazines for crown corks or similar closures are known for use with closing or capping machines. In the simplest case, such a closure magazine has a magazine chamber that is adjoined by a closure channel that, as a closure supply channel, leads to a transfer station at which the closures are transferred to closing elements and/or to the containers that are to be capped. In this connection, the closure channel has an essentially rectangular cross-sectional configuration that is adapted to the shape and size of the closures in such a way that all of the closures in the closure channel are inherently oriented such that their central axes are disposed perpendicular to the axis of the closure channel, and the open or closed sides of the closures are disposed adjacent to the respectively larger cross-sectional sides of the closure channel. The closure channel is furthermore provided with a turnover zone where those closures that do not have the correct orientation with respect to their open or closed sides are turned over.

To accommodate higher outputs, the closure magazine, in addition to the magazine chamber, frequently has a collection chamber in which the closures are conveyed via a closure channel that is embodied as a turnover channel, so that all of the closures in the collection chamber already have the correct orientation with respect to their open and closed sides. Adjoining the collection chamber is then the closure channel, which is embodied as a feed channel.

Within the context of the present invention, both the magazine chamber as well as the collection chamber are also designated as "chamber".

A device of the aforementioned general type is known (DE-PS 30 49 525, U.S. Pat. No. 4,006,812). With this known device, the magazine chamber is formed by the interior of a fixed drum, the axis of which is oriented in the vertical direction. Disposed in the drum is a disk that can be driven so as to rotate about the vertical drum axis; this disk forms the base of the magazine chamber, and its rim portion extends into an extension that is formed at the periphery of the drum and extends outwardly radially relative to the vertical drum axis, so that at this location an annular channel is formed between the upper side of the disk and a ring that forms this extension. The annular channel surrounds the vertical drum axis and is open in a radially inward direction; at the transition, a horizontal portion of the closure channel leads tangentially away from the annular channel. A number of permanent magnets are provided at the periphery of the disk. These permanent magnets form a magnetic field that extends around the vertical axis of the disk or drum; by means of this magnetic field, the closures are conveyed out of the magazine chamber and into the closure channel. In this connection, the disk forms a horizontal abutment and guide surface for the open or closed side of the closure, with the abutment surface being disposed in a plane that extends perpendicular to the axis about which the magnetic field is moved, i.e. about which the permanent magnets rotate.

The intention of this known device is that due to the rotating disk, the closures will be moved into the annular channel by centrifugal force. This has serious drawbacks in that the closures can jam against and block one another not only in the region of this annular channel but rather in particular also at the transition to the closure channel. A further drawback of the known device is that a relatively high abrasion of the closures as well as a relatively loud operation results.

It is therefore a object of the present invention to improve the device of the aforementioned general type in such a way that although a straightforward construction is provided, the device will have a considerably improved mode of operation as well as an improved operational reliability.

BRIEF DESCRIPTION OF THE DRAWINGS

This object, and other objects and advantages of the present invention, will appear more clearly from the following specification in conjunction with the accompanying schematic drawings, in which:

FIG. 6 is a view similar to that of FIG. 4 showing a third exemplary embodiment of the inventive device;

FIG. 7 is a view similar to FIG. 3 and shows a fourth exemplary embodiment of the inventive device;

FIG. 8 is a simplified cross-sectional view of a crown cork magazine of a closing or capping machine, together with a further exemplary embodiment of the inventive device at the transition to the closure channel;

FIG. 9 is a cross-sectional view taken along the line IX—IX in FIG. 8;

SUMMARY OF THE INVENTION

Figures 1, 2, 5:
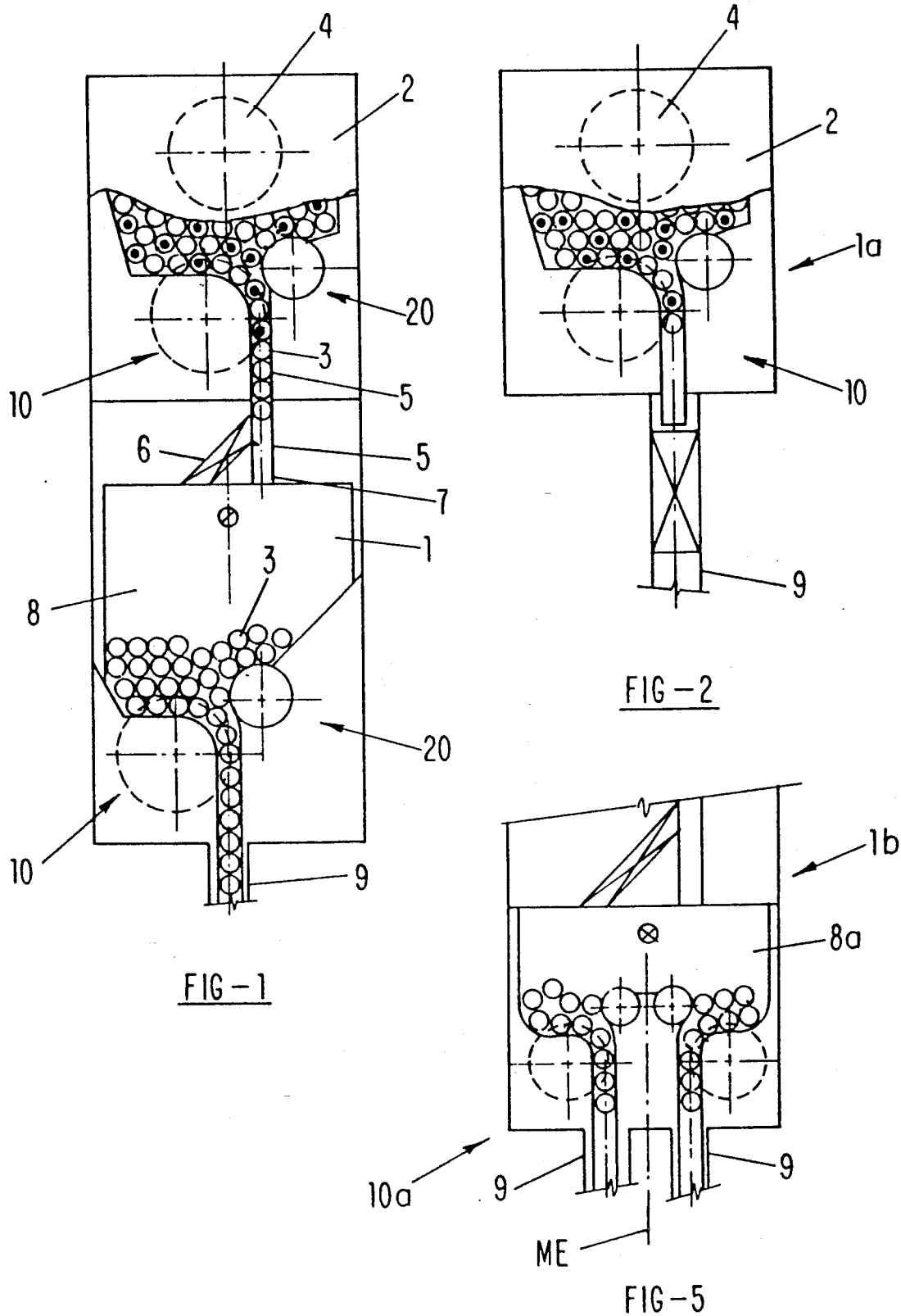
FIG. 1 shows a crown cork magazine of a closing or capping machine with a magazine chamber, an adjoining closure channel that has two outlets, a collection chamber, and an adjoining vertical closure channel, with respective devices according to the present invention at the transition to the closure channels.
FIG. 2 is a view similar to FIG. 1, and shows a crown cork magazine of a closing or capping machine, with a magazine chamber and an adjoining closure channel that has a turnover zone, along with a device according to the present invention at the inlet of this closure channel.
FIG. 5 shows the collection chamber of a crown cork magazine with two adjoining vertical closure channels and with a second exemplary embodiment of the inventive device provided at the transition or inlet to these closure channels.

The device of the present invention comprises at least one magnetic conveying means that, at least at a transition formed partially in the chamber and partially in an entry region of the closure channel, exerts, via a moving magnetic field, a conveying effect upon the closures in a first conveying direction for introducing the closures into the closure channel, whereby the magnetic field moves along a path of movement that is curved about an axis, and the chamber, at least at the transition, is bounded by at least one first abutment or guide surface against which the open or closed sides of the closures rest, with the first abutment or guide surface being disposed in a plane that extends perpendicular to the axis of the path of movement of the magnetic field, whereby the path of movement of the magnetic field extends in the first conveying direction at the transition in the chamber and in the entry region of the closure channel, and whereby the plane of the first abutment or guide surface as well as a plane of the path of movement of the magnetic field are disposed at an angle relative to a horizontal direction.

With the inventive device, the planes in which the "first" abutment or guide surface of the closures is disposed and in which the magnetic field rotates are either a plane that is disposed at an acute angle relative to the horizontal or is a vertical plane.

Pursuant to one preferred specific embodiment of the present invention, where the first abutment or guide surface for the opened or closed side of the closures is disposed in a plane that is inclined relative to the horizontal, i.e. is disposed in a plane that forms an angle of less than 90° and greater than 0° with the horizontal, and preferably an angle of between about 55 and about 65°, the transition to the closure channel is disposed at the top relative to this inclination, or to the path of movement of the magnetic field or the at least one permanent magnet. This has the advantage that by means of the magnetic conveying means, from the random or non-oriented quantity of closures present below the transition, only a specific portion of closures are respectively carried along upwardly to the transition and can be introduced into the closure channel without jamming, whereas excess closures are not adequately held by the conveying means and therefore fall back into the non-oriented quantity of closures.

Pursuant to another specific embodiment of the invention, where the chamber, at least in the region of the transition, is formed by two horizontal wall portions that are disposed parallel to one another and are spaced from one another, and where the wall portions respectively form a vertical abutment and guide surface for the open or closed side of the closures, there is provided at the base of this chamber a base portion that is convexly curved in a direction toward the interior of the chamber and that is adjoined by the transition or closure channel. The convexly curved base portion, which forms a "second" abutment and guide surface for the rim of the closure, is in this connection disposed within the path of movement along which the magnetic field or the at least one magnet rotates in the conveying direction. At the entry region of the closure channel, on that side that is across from the base region, there is furthermore provided a device for loosening or separating the closure stream formed by the closures.

With the present invention, the magnetic conveying means, i.e., the elements thereof, can be disposed in such a way that to a large extent smooth passages result at the transition between the chamber and the closure channel. In this way, areas that are difficult to access and at which foreign material, such as dirt, dust, etc. could be deposited, are avoided. Furthermore, due to the largely smooth passages without projecting structure, a cleaning in place or CIP cleaning is possible.

Further specific features of the present invention will be described in detail subsequently.

DESCRIPTION OF PREFERRED EMBODIMENTS

Figure 4:
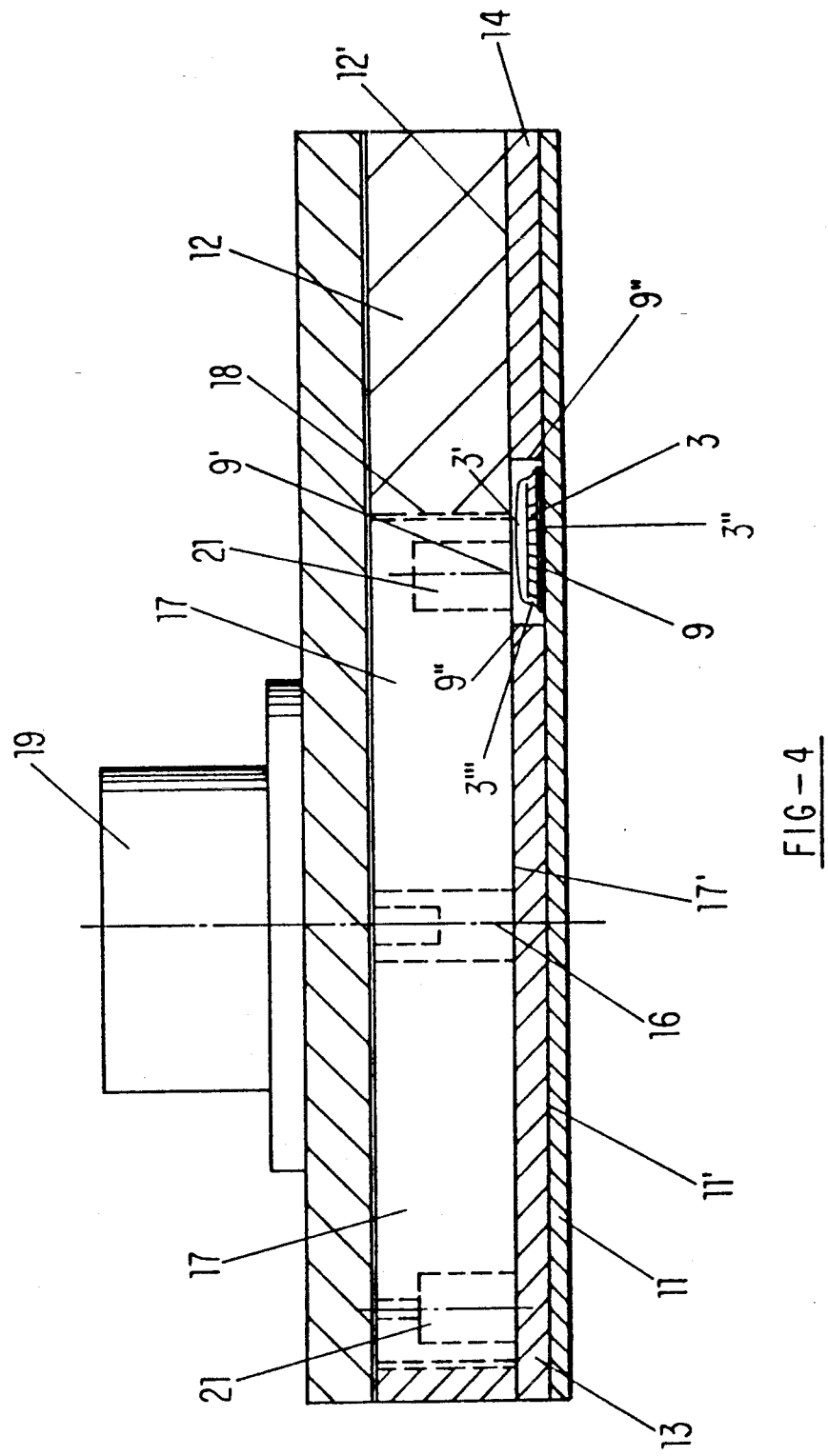
FIG. 4 is a cross-sectional view taken along the line IV—IV in FIG. 3.

Referring now to the drawings in detail, FIG. 1 illustrates a crown cork or cap magazine 1 for use with a closing or capping machine. In a conventional manner, this crown cork magazine comprises an upper magazine chamber 2 that serves for accommodating a random or non-oriented quantity of crown corks or caps 3, and is provided with a conventional mixing mechanism 4. A vertical cap or closure channel 5 is connected to the magazine chamber 2, which narrows toward the bottom in a funnel-like manner. The closure channel 5, as a turnover channel, opens out into a collection chamber 8 via two outlets 6 and 7. The collection chamber 8, which narrows at its underside, opens out into a closure channel 9 that, as a crown cork feed channel for conveying the crown corks 3, leads to a non-illustrated station for supplying crown corks 3 to a closure element. The cross-sectional areas of the closure channels 5 and 9 are adapted to the size of the crown corks 3 in such a way that only rows of crown corks 3 can form in these closure channels; in these rows, the crown corks 3 follow one another in single file, with the central axis of each crown cork being oriented in the same direction at right angles to the longitudinal direction of the channel, i.e. with respect to the illustration of FIG. 1 perpendicular to the plane of the drawing. In a similar manner, the cross-sectional area of the collection chamber 8 is such that here also the central axes of the crown corks 3 are exclusively oriented in a single direction, i.e. perpendicular to the plane of the drawing. Each of the two closure channels 5 and 9 has a rectangular cross-sectional configuration (see, for example, FIG. 4), with the longer cross-sectional sides being adjacent either the closed side or the open side of a crown cork 3, while the two shorter cross-sectional sides are respectively adjacent the rim of a crown cork 3. In FIG. 4, the closed side of the crown cork 3 is indicated by the reference numeral 3', the open side is indicated by the reference numeral 3″, and the rim is indicated by the reference numeral 3‴.

Figure 3:
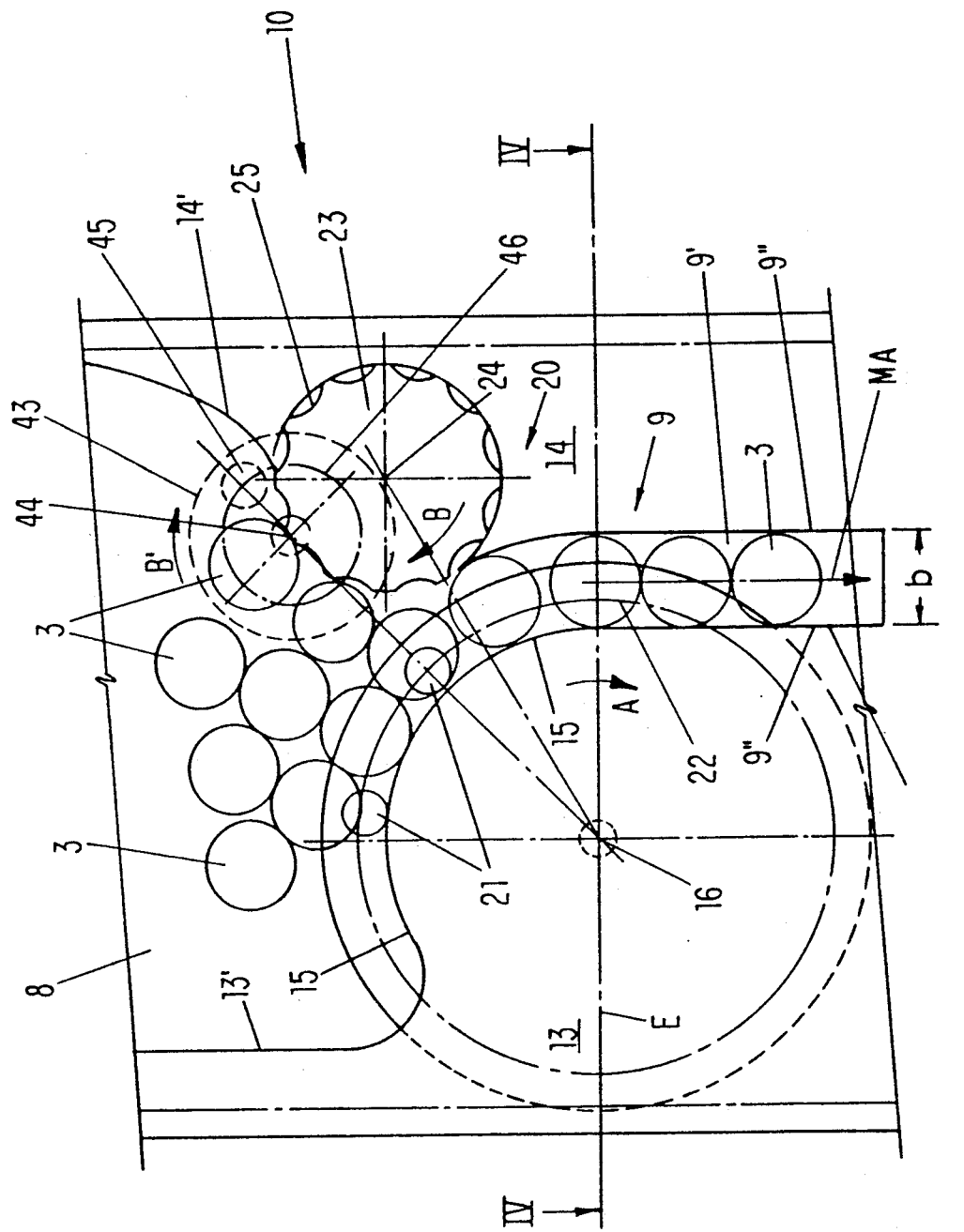
FIG. 3 is an enlarged view of one exemplary embodiment of the inventive device from FIGS. 1 and 2.

In the closure channel 5, ahead of the outlets 6 and 7 that open out into the collection chamber 8, the crown corks 3 can have only two possible orientations relative to the closed side 3′ and the open side 3″. In the collection chamber 8 and in the closure channel 9, all of the crown corks 3 then also have this same orientation relative to the closed side 3′ and the open side 3″. In FIGS. 3 and 4, the larger cross-sectional sides of the closure channel 9 are designated with the reference numeral 9′ and the smaller cross-sectional sides are designated with the reference numeral 9″.

At the transitions 20 between the magazine chamber 2 and the closure channel 5 on the one hand, and the collection chamber 8 and the closure channel 9 on the other hand, is a respective device 10 that enhances and advances the flow of the crown corks 3 out of the magazine chamber 2 or 8 and into the following closure channel 3 or 9 respectively. The device 10 that is disposed at the transition 20 between the collection chamber 8 and the closure channel 9 is shown in detail in FIGS. 3 and 4. The device 10 that is disposed at the transition 20 between the magazine chamber 2 and the closure channel 9 in FIG. 2 has an identical configuration.

As shown in particular in FIG. 4, the crown cork magazine 1, for example at the lower region of the collection chamber 8 and at the transition 20 to the closure channel 9, essentially comprises two outer plates 11 and 12, with the plate 11 being made of transparent material, for example glass; central plates 13 and 14 are disposed between these two outer plates 11 and 12, with the central plates 13 and 14 having a thickness that is somewhat greater than the height of the crown corks 3, and with these central plates 13 and 14 being appropriately selected or formed to form the collection chamber 8 as well as that portion of the closure channel 9 that adjoins the collection chamber 8.

The inwardly directed, facing surfaces 11′ and 12′ of the outer plates 11 and 12 from the surfaces against which the closed side 3′, and open side 3″ of the crown corks 3 rest (FIG. 4). The inwardly disposed edges 13′ and 14′ of the plates 13 and 14 form abutment surfaces for the rims 3‴ of the crown corks 3 (FIG. 3).

At the lower end, at the transition 20 to the closure channel 9, the collection chamber 8 has a base portion 15 that has the shape of a circular arc and is convexly curved in a direction toward the interior of the collection chamber 8. The base portion 15 is formed from an appropriately curved portion of the edge 13′, and merges into one of the two shorter cross-sectional sides 9″, in particular, in FIGS. 3 and 4, into the left one of the two cross-sectional sides 9″ of the closure channel 9. The base portion 15 is curved about a horizontal axis 16 that extends perpendicular to the plane of the drawing of FIG. 3, and, when viewed in a vertical direction, is disposed below the base portion 15. At least at that portion of the closure channel 9 that adjoins the collection chamber 8 (FIG. 3), the surface 11′ of the plate 11 that is provided at the front side of the crown cork magazine 1 also completely forms one of the two longer cross-sectional sides 9′ of the closure channel 9, and in particular for FIG. 4, the lower cross-sectional side 9′. At the transition 20 between the collection chamber 8 and the closure channel 9, the other cross-sectional side 9′ is partially formed by the surface 12′ of the plate 12 and is partially formed by a planar end face 17′ of a disk or similar member 17 that has a circular circumferential surface. In this connection, the member 17 is disposed in a circular recessed portion 18 of the plate 12 in such a way that the end face 17′ is essentially disposed in the same plane as the inner surface 12′. The member 17 is coaxial with the axis 16 and is mounted on the crown cork magazine 1 so as to be rotatable about the axis 16. By means of a drive means 19, the member 17 can be rotationally driven about the axis 16 in the direction of the arrow A. The radius of the member 17 is greater than the radius of curvature of the base portion 15, so that also in the region of the base portion 15, the lateral delimitation of the collection chamber 8 is formed not by the surface 12′ of the plate 12, but rather by the end face 17′ of the member 17. The radius of the member 17 is less than the sum of the radius of curvature of the base portion 15 and the width "b", i.e. the greater cross-sectional dimension, of the closure channel 9, so that at the transition 20 from the collection chamber 8 to the closure channel 9, the one greater cross-sectional side 9′ of the closure channel 9 is formed partially by the end face 17′ and partially by the surface 12′ of the plate 12.

In the illustrated embodiment, the radius of the member 17 is such that at the transition 20 a little more than half, for example two thirds, of the longer cross-sectional side 9′ is formed by the end face 17′.

A plurality of circular cylindrical permanent magnets 21 are provided in the peripheral portion of the member 17, which is not made of ferromagnetic material, being made, for example, of plastic; these permanent magnets 21 are distributed about the axis 16 with an equal angular spacing. The permanent magnets 21, which in the illustrated embodiment have a diameter that is less than the diameter of the crown corks 3, are either flush with the end face 17′ or are separated therefrom by a thin wall portion, with the permanent magnets 21 being disposed in recessed portions of the member 17, and in particular with an angular spacing or interval that corresponds to the spacing of three crown corks 3 that rest against the base portion 15. In the illustrated embodiment, a total of nine permanent magnets 21 are provided, being disposed at an angular spacing of 40°. The central axis of each permanent magnet 21 is disposed parallel to the axis 16 and lies on a common circle that surrounds this axis. The radius of this circle is less than the sum of the radius of curvature of the base portion 15 and half of the width "b", in other words, in the embodiment illustrated in FIG. 3, the central axes of the permanent magnets 21 move along a circular path of movement 22 that is disposed at the transition 20 between the central axis MA of the closure channel 9 and the base portion 15, i.e. the cross-sectional side 9″ adjoining this base portion 15, whereby the radial distance between the base portion 15 and the path of movement 22 is less than half of the diameter of the crown corks 3.

Disposed across from the base portion 15 at the transition 20 is a wheel 23 that has an essentially circular peripheral surface and is mounted on the crown cork magazine 1 so as to be rotatable about an axis 24 that extends parallel to the axis 16. By means of a drive means, preferably the drive means 19 in conjunction with a suitable gear mechanism, the wheel 23 can be rotated in the direction of the arrow B. Whereas the direction of rotation A of the member 17 is such that this member moves at the transition 20 in the direction of an introduction of the crown corks 3 out of the collection chamber 8 and into the closure channel 9, in other words, in the embodiment illustrated in FIG. 3, the member 17 is rotated in a clockwise direction, the wheel 23, which serves to loosen up the crown corks 3 and in particular is intended to prevent jamming of the crown corks 3 at the transition 20, is driven in such a way that crown corks 3 that rest against the periphery of the wheel 23 are moved away from the transition 20, i.e. away from the inlet into the closure channel 9. Thus, the wheel 23 is driven in the same direction of rotation as is the member 17, in other words, in the embodiment illustrated in FIG. 3, the wheel 23 is also rotated in a clockwise direction. The periphery of the wheel 23 is provided with a plurality of groove-like recesses 25 that in the illustrated embodiment have a cross-sectional shape of a circular arc, and in particular with a radius equal to about half of the maximum diameter of the crown corks 3. A portion of the periphery of the wheel 23 extends into the collection chamber 8 and forms the transition between the lateral delimitation of the collection chamber 8 that is formed by the edge 14', and the other shorter cross-sectional side 9" of the closure channel 9 that is disposed across from the base portion 15.

As the member 17 rotates, the permanent magnets 21 carry along the crown corks 3 that are respectively disposed at the base portion 15 or in the vicinity thereof, with these crown corks 3 being conveyed into the closure channel 9. Within the closure channel 9, i e. below a horizontal plane E that includes the axis 16, the permanent magnets 21 move sideways away from the closure channel 9. Each of the crown corks 3 that has been carried along by a permanent magnet 21 to this point is thereby released and can move further down in the closure channel 9 due to the force of gravity.

Despite the relatively great angular spacing between the permanent magnets 21 even at the transition 20 the crown corks S follow one another very closely. In other words, each crown cork 3 that is directly held by a permanent magnet 21 moves or pushes preceding crown corks 3 forwardly. Due to the relatively great angular spacing between the permanent magnets 21, a neutral region is formed in which the strength of the magnetic field is reduced at least to such an extent that a magnetic force that would effect a carrying-along and/or holding of a crown cork 3 is not exerted in this region, in other words, the relatively great angular distance between the permanent magnets 21 ensures that at the location where a crown cork 3 in the closure channel 9 is released by a permanent magnet that is moving sideways away, this crown cork cannot be held by a subsequent permanent magnet 21. The latter situation would lead, if not to a jamming, at least to a disruption in the conveyance of the crown corks 3 in the closure channel 9. The aforementioned course of the path of movement 22, which is offset relative to the central axis MA, also contributes to a satisfactory release, from the permanent magnets 21, of the crown corks 3 that are respectively introduced into the closure channel 9. Furthermore, the offset disposition of the path of movement 22 ensures that the crown corks 3 are guided along the circular base portion 15 and pass into the closure channel 9. This helps to prevent an arching or jamming of crown corks 3 at the transition 20.

As shown in FIG. 3, at the transition 20 a short portion of the closure channel 9, which corresponds approximately to an angle of 30°, is curved about the axis 16 in the shape of a slight circular arc; formed in this curved region is the actual inlet of the closure channel 9, and in particular essentially between the base portion 15 and the circumferential surface of the wheel 23.

FIG. 3 also shows that the radius of the wheel 23 is less than the radius of curvature of the base portion 15, and that the connecting line between the axes 16 and 24 intersects the plane E at an angle of about 30°.

It is to be understood that the wheel 23 is disposed between the two plates 11 and 12. However, it is in principle also possible, in place of such a relatively thin, disk-like wheel 23, to provide a disk or roller that extends into an accommodating recess of the plate 11 or 12, or in the region of such a recess extends through the plate 11 or 12.

FIG. 5 shows a device 10a that differs from the device 10 essentially only in that the device 10a has a twin construction to supply two closure channels 9 from a single collection chamber 8a; in particular, two devices 10 are disposed as mirror images of one another relative to a central plane ME, to which also the two closure channels 9 are disposed in a symmetrical manner.

FIG. 6 shows a device 10b that differs from the device 10 essentially only in that in place of the member 17, a disk or similar member 17a is disposed outwardly, i.e. is separated from the collection chamber 8 and the closure channel 9 by the plate 12 or a thinner portion 12" of this plate. In this way, at the transition 20 also the plate 12, i.e. the inwardly disposed surface 12' thereof, is continuous. In the same way as with the member 17, the member 17a is provided with permanent magnets 21 and is driven in a rotating manner. The crown corks 3 are carried along by the magnetic flux, which extends through the material of the plate 12 or portion 12". The plate 12 or portion 12" are made of a nonferromagnetic material.

If the device 10b is disposed at the transition between the magazine chamber 2 and the closure channel 5, in other words at that location where the closed or open sides 3' or 3" of the crown corks 3 can have two different orientations, it can be expedient to also dispose a member 17a on the outside of the plate 11, with the two members 17a then being disposed on a common shaft.

FIG. 7 shows a device 10c where the magnetic conveying effect is not generated by a rotating member 17 or 17a that is provided with the permanent magnets 21, but rather is generated by a magnet arrangement 26 that, for example, comprises a plurality of magnets that are provided in the region of the curved base portion 15 and, relative to the latter, are disposed on the plates 11 and/or 12 at a greater radial distance from the axis 16. Via a control means these magnets are activated or excited in such a way that there results a moving electrical field that moves in the direction of the arrow A', whereby also in this case the successive maximum strength of the magnetic fields as viewed in the movement or conveying direction A' are spaced from one another in such a way that a neutral region is formed in which the strength of the magnetic field is reduced at least to such an extent that no magnetic force is exerted in this region that is strong enough to effect a carrying along and/or holding of a crown cork S. This spacing then preferably corresponds to a multiple of, for example three times, the diameter of the crown corks 3. With the device 10c, in place of the wheel 23 for loosening the crown cork stream or for preventing an arching that would block or disrupt the stream of crown corks, there is provided across from the base portion 15 at the inlet to the closure channel 9 a loosening mechanism in the form of a sector-shaped element 27 that is pivoted back and forth in the direction of the arrow B'.

FIGS. 8 and 9 show a crown cork magazine 1c having a device 10d for the introduction of the crown corks 3 from a magazine chamber 28, in which again a plurality of such crown corks 3 are accommodated in a non-oriented or random manner, into an adjoining closure channel 29.

The magazine chamber 28 is formed from the inner chamber of a hopper 30 that has a cylindrical peripheral wall 31, with the axis 32 of the hopper being inclined relative to the horizontal. In the illustrated embodiment, the axis 32 of the hopper 30 forms an angle of approximately 30° with the horizontal.

In the illustrated embodiment, in the region of the lower edge the peripheral wall 31 is secured to the inner surface of a radially outwardly disposed ring 33 that surrounds the axis 32 of the hopper 30. The ring 33, in turn, is secured to the upper edge region of a ring-like annular wall 34 that concentrically surrounds the hopper axis 32 and the ring 33. In the region of its lower edge, the annular wall 34 is secured to a carrier plate 35 that has the shape of a circular disk. With the aid of the carrier plate 35, the hopper 30 is secured to a non-illustrated machine frame of the crown cork magazine 1c in such a way that the hopper axis 32 has the aforementioned inclination.

The hopper 30 is open at the top for the introduction of the crown corks 3. The base of the hopper 30, i.e. of the magazine chamber 28, is formed by a disk or similar member 36 having a circular peripheral surface; the axis of the member 36 is coaxial with the hopper axis 32, and the member 36 is mounted in the carrier plate 35 so as to be rotatable about this axis. Via a non-illustrated drive means, the member 36 can be driven about the axis 32, and in particular in the direction of the arrow C of FIG. 9.

In the illustrated embodiment, the member 36 is made of plastic and its planar, upper side, which faces the open side of the magazine chamber 28, is provided with a thin layer or coating 37 of a material that allows magnetic flux to pass through. In the illustrated embodiment, this coating 37 comprises a sheet metal blank made of nonferromagnetic high-quality steel. The coating 37 is secured to the member 36 by, for example, being glued thereto or in any other suitable manner. The circumferential edge, i.e. the edge region 36', of the member 36 extends to the vicinity of the annular wall 34 and extends below the ring 33. The upper side of the member 36, i.e. the coating 37, is, when viewed in an axial direction parallel to the hopper axis 32, spaced from the underside 33' of the ring 33, which underside is disposed in a plane that extends perpendicular to the hopper axis 32, by such a distance that a channel-like region 38 is formed below the ring 33 between the latter and the edge region 36'; relative to the hopper axis 32, the channel-like region 38 is open radially inwardly to the magazine chamber 28 and extends concentrically relative to the hopper axis 32. The region 38 has an approximately rectangular cross-sectional configuration that is adapted to the shape of the crown corks 3 such that the latter can have only two possible orientations in the region 38, namely either the closed side 3' or the open side 3" of the crown corks must rest upon the upper side of the member 36. Accordingly, in a direction parallel to the hopper axis 32 the region 38 has a height "h" that is somewhat greater than the height of the crown corks 3, but in any case is considerably less than the diameter of the crown corks 3. In the illustrated embodiment, the radial width b' of the region 38 corresponds to the diameter of the crown corks 3.

Provided at the edge region 36' are a plurality of permanent magnets 39 that correspond in shape and size to the permanent magnets 31. The magnets 39 are held in recessed portions of the member 36 such that their axes extend parallel to the hopper axis 32. The permanent magnets 39 are again spaced from one another at the periphery of the member 36 in such a way that between two permanent magnets 39 that follow one another in the direction of rotation C a neutral region is formed, i.e. in this embodiment the spacing of the permanent magnets 39 is such that between two crown corks 3 that are respectively disposed or held above a permanent magnet 39, there is space for a crown cork 3 that is not provided in the region of a permanent magnet 39. In the illustrated embodiment, a total of 22 permanent magnets are provided on the edge region 36' and have an angular spacing of about 16° from one another.

At the upper region, made possible by the inclined orientation of the hopper axis 32, the closure channel 29 branches off tangentially from the region 38. After a horizontally extending portion, the closure channel 29 has a curved portion that leads to an essentially vertically downwardly extending portion. The closure channel 29 again has a rectangular cross-sectional configuration with larger cross-sectional sides 29' and smaller cross-sectional sides 29". Also provided in the closure channel 29 is a zone for turning over those crown corks 3 that do not have the correct orientation relative to their closed side 3' or their open side 3".

At the transition 40 between the magazine chamber 28, i.e. the region 38, and the closure channel 29, one of the larger cross-sectional sides 29' is essentially disposed in the same plane as the upper side of the member 36, and the other cross-sectional side 29' is disposed thereabove, for example in the same plane as the underside 33'. In relation to the hopper axis 32, the furthest outwardly disposed narrower cross-sectional side 29" abuts the outer delimiting surface or abutment of the region 38 that is formed by the annular wall 34. Furthermore, in the illustrated embodiment there is provided at the transition 40 a strip-like guide piece 41 that does not rotate with the member 36, i.e. is stationary. With reference to the hopper axis S2, the radially outwardly disposed side of the guide piece 41 forms a guide surface 41' that merges into the other narrower cross-sectional side 29' that is disposed the closest to the hopper axis 32. At the transition 41, the linear guide surface 41' is radially spaced from the hopper axis 32 by a distance that is less than half of the diameter of the member 36 by the width b'.

The crown corks 3, which are introduced into the magazine chamber 28 and rest upon the rotating member 36, slide (enhanced by the centrifugal force of the rotating member 26) sideways into the channel-like region 38, where they are carried along by the permanent magnets 39, and in particular are carried along in the channel-like region 38 upwardly at an angle to the transition 40, where the crown corks 3 are then successively pushed into the channel 29 in a sliding manner at the guide surface 41' by the guide piece 41, which acts as a skimmer.

As shown in FIGS. 8 and 9, the central axes of the permanent magnets 39 move along a circular path of movement 42 that is disposed closer to the outer boundary of the region 38, i.e. the annular wall 34, than is the central axis MA'. In this way, a crown cork 3 that is held by a permanent magnet 39 is drawn completely into the region 38 and can thus be satisfactorily conveyed past the end 41" of the guide surface 41' and into the channel 29 without a backup of crown corks occurring at this end 41" of the guide piece 41.

Figure 10:
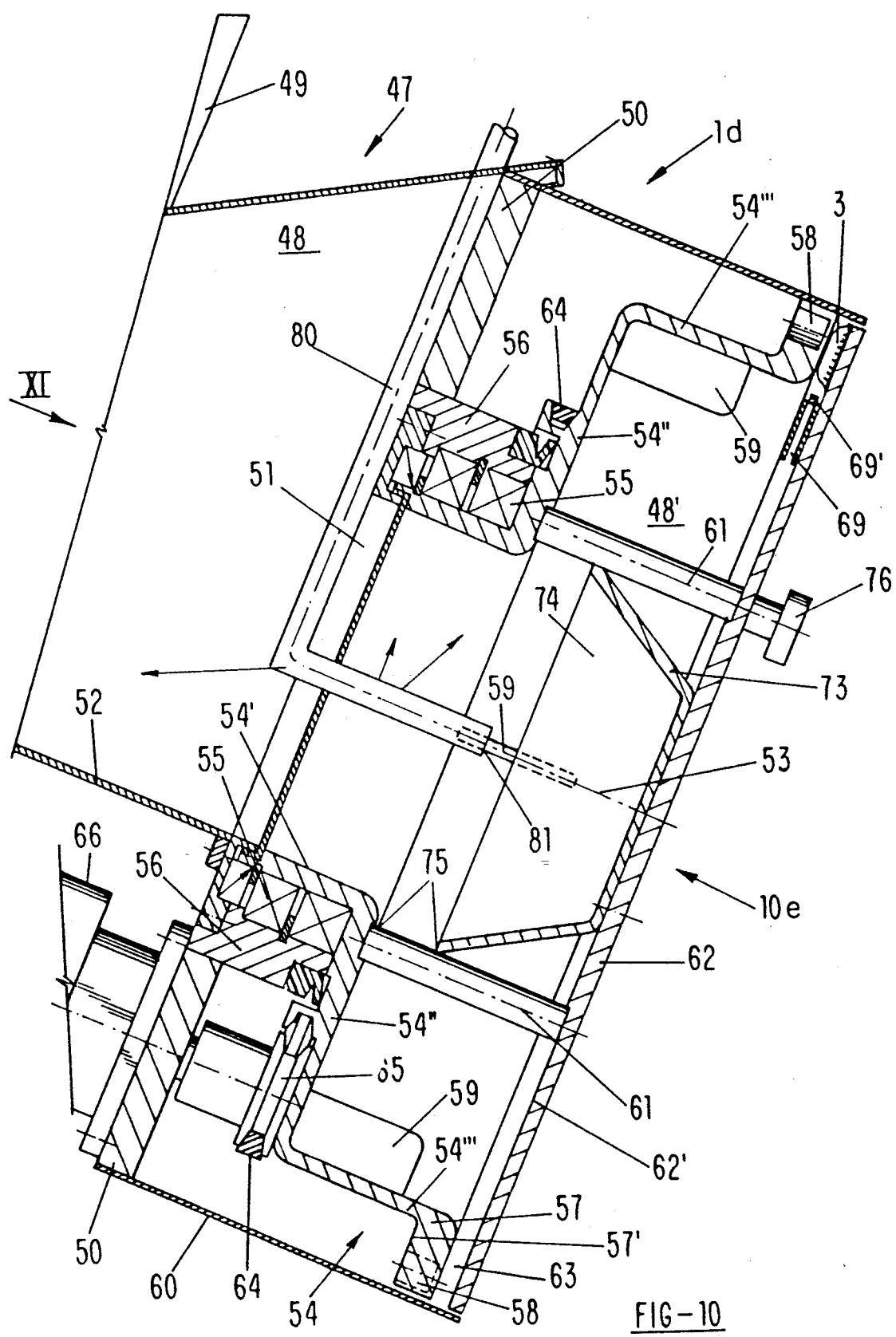
FIG. 10 is a view similar to that of FIG. 8 showing a further exemplary embodiment of the inventive device at the transition to the closure channel.
Figure 11:
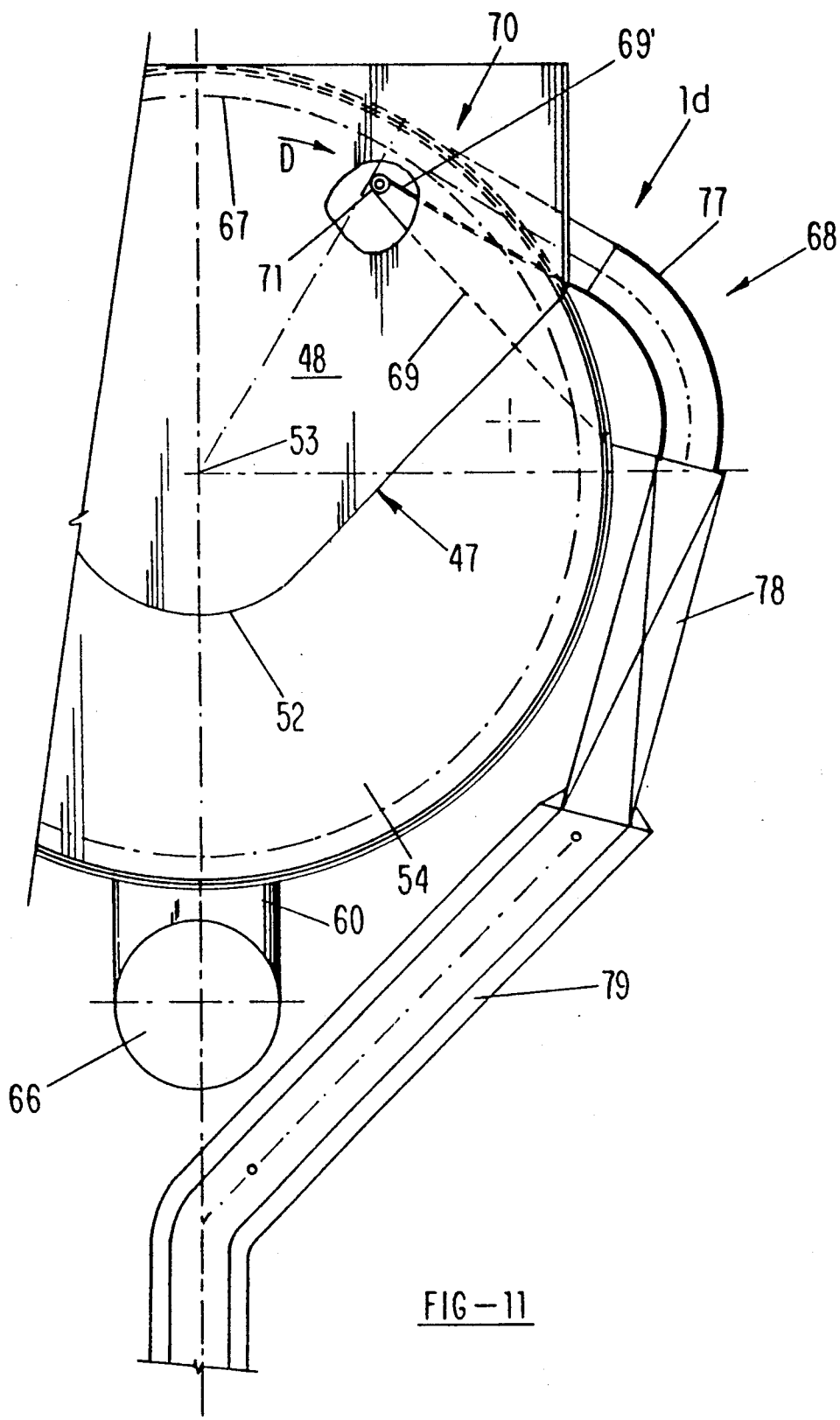
FIG. 11 is a partially broken away view of the crown cork magazine take n in the direction of the arrow XI in FIG. 10.
Figure 12:
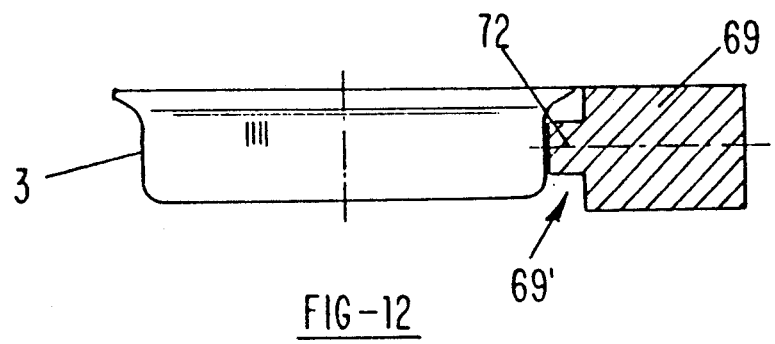
FIG. 12 is a cross-sectional view through a guide piece of the crown cork magazine of FIG. 10, and also shows a crown cork.

FIGS. 10 to 12 show a crown cork magazine 1d that has a hopper-like container 47 with a magazine chamber 48 for accommodating a plurality of crown corks 3 and also having an inlet 49 for introducing these crown corks 3 into the magazine chamber 48. On one side, the magazine chamber 48 is delimited by a plate 50 that is inclined relative to the vertical. The plate 50 has a circular opening 51, the lower portion of the rim of which is aligned with the convexly curved inner surface of a base region 52 of the hopper 47, i.e. the base region 52 extends, in the shape of a circular arc, around the axis 53 of the opening 51, which axis is also inclined relative to the vertical.

On that side of the plate 50 that is remote from the magazine chamber 48, a wheel 54 is mounted so as to be rotatable about the axis 53. In particular, the wheel 54 is mounted to the plate 50 at a circular cylindrical flange 54' that is provided directly at the opening 51, and is mounted via ball bearing means 55 and an annular mounting support 56. The configuration of the flange or portion 54' is such that its inner surface is aligned with the inner surface of the opening 51.

The wheel 54 furthermore comprises a disk-like portion 54" that extends radially beyond the peripheral surface of the portion 54'. A radially outwardly disposed part of the portion 54" merges into a circular cylindrical or cup-shaped portion 54''' that concentrically surrounds the axis 53; the portion 54''' projects away from that side of the portion 54" that is remote from the portion 54'. At that edge of the portion 54''' that is remote from the portion 54", the wheel 54 is provided with a radially outwardly projecting, annular flange 57 that in the illustrated embodiment is integral with the remainder of the wheel 54, concentrically surrounds the axis 53, and is provided with a plurality of permanent magnets 58 that are uniformly spaced from one another. With the crown cork magazine 1d, these permanent magnets 58 are spaced from one another by a distance that is equal to or less than the diameter of the crown corks 3. In place of a plurality of permanent magnets 58, it would also be possible to use a single, ring-shaped permanent magnet that is held in the flange 57 in a suitable manner. At least in the region of the flange 57, the wheel 54 is made of a nonferromagnetic material.

At the transition between the portions 54" and 54''', the inner side of the wheel 54 is provided with a plurality of lamellar or vane-like ribs 59 that project into the chamber 48' that is surrounded by the wheel 54.

A circular cylindrical housing 60 is provided on the plate 50; this housing 60 concentrically surrounds the axis 53 as well as the wheel 54. The inner diameter of the housing 60 is such that the inner surface thereof surrounds and is slightly spaced from the outer peripheral surface of the flange 57.

A plate 62 having the shape of a circular disk is secured to the wheel 54 via a plurality of bolts or similar fastening means 61 that are uniformly distributed about the axis 53 and extend parallel thereto. In particular, the plate 62 is secured to the wheel 54 in such a way that the circular peripheral surface of the plate 62 also concentrically surrounds the axis 53, with the inner surface 62' of the plate 62 being spaced from the annular surface 57' of the flange 57 that faces the plate 62, so that an annular gap 63 is formed between the peripheral surface of the plate 62 and the annular surface 57'. The annular gap 63 is delimited toward the outside by the housing 60, and has an axial width, when viewed in a direction parallel to the axis 53, that is somewhat greater than the height of the crown corks 3, but at any rate is less than the diameter of these crown corks 3; the radial width of the gap 63 is defined by an appropriate construction of the flange 57 and is somewhat greater than the diameter of the crown corks 3.

An outwardly disposed region of the portion 54" of the wheel 54 is embodied as a V belt pulley and is driven via a V belt 64 by a V belt pulley 65 of a drive means 66 (geared motor) that is disposed on the plate 50 below the base region 52. Rotating along with the driven wheel 54 is the plate 62, which is concentrically surrounded by the housing 60. In so doing, the axes of the cylindrical permanent magnets 58, which axes are parallel to the axis 53, move along a path of movement 67 that concentrically surrounds the axis 53. The distance of the path of movement 67 from the inner surface of the housing 60, and hence from the radially outwardly disposed delimitation of the gap 63, is less than half of the diameter of the crown corks 3.

In the upwardly disposed region of the path of movement 67, i.e. at the transition 70 located there, a closure channel 68 opens out tangentially into the gap 63; this closure channel 68 again has a rectangular inner cross-sectional configuration. At that location where the closure channel 68 opens out into the gap 63, the two larger cross-sectional sides of the closure channel are approximately aligned with the inner surface 62' of the plate 62 and with the annular surface 57' respectively. One of the two narrower cross-sectional sides is flush at the transition 70 and is approximately aligned with the outer delimiting surface of the gap 63, i.e. with the inner surface of the housing 60. The other narrower cross-sectional side of the closure channel 68 again forms the continuation of the outwardly disposed (relative to the axis 53) side or guide surface 69' of a guide piece 69, which corresponds in function to that of the guide piece 41, yet with the crown cork magazine 1d has a triangular or sector-shaped configuration. The guide piece 69, which is provided at the transition 70 between the gap 63 and the closure channel 68, is provided at its free end with a roller 71 that is freely rotatably mounted about an axis that extends parallel to the axis 53. The roller 71 forms the region with which the crown corks 3 that are carried along by the wheel 54, i.e. with the flange 57, first come into contact at the transition 70 prior to introduction into the closure channel 68. The roller 71 facilitates introduction of the crown corks 3 into the closure channel 68.

To reduce the friction of crown corks 3 at the guide surface 69', the guide piece 69 is provided at the guide surface 69' with the cross-sectional configuration illustrated in FIG. 12, i.e. in the middle the guide surface 69' has a rib-like projection 72 that extends in the longitudinal direction of the guide surface; the smooth peripheral region 3'''' of the crown cork 3 rests against this projection 72. The peripheral surface of the roller 71 also has a similar configuration, i.e. the peripheral surface of the roller 71 has the same cross-sectional profile as does the guide surface 69'.

A specific quantity of crown corks 3 passes out of the magazine chamber 48, through the opening 51, and into the interior of the wheel 54 (the chamber 48'), and in particular in such a way that especially in the lower region the gap 53 is filled with crown corks 3. To prevent too great of a density of crown corks 3 within the chamber 48' at the transition to the gap 63, and hence to avoid in particular a jamming of the crown corks 3 against one another, a member 73 having the shape of a truncated cone is secured to the inner surface 62'; in particular, the base of the member 73 is secured to the inner surface 62' in such a way that the member 73 is coaxial with the axis 53 and, relative to this axis, the open rim of the member 73 is disposed across from the inner surface of the wheel 54 at the transition between the portions 54' and 54" thereof and is actually spaced from this transition in such a way that there is formed between the inner surface of the wheel 54 and the rim 74 an annular gap 75 that surrounds the axis 53 and allows crown corks 3 to pass through. The width of this gap 75 is such that during the operation of the crown cork magazine 1d, a sufficiently large number of crown corks 3 can pass into the portion of the chamber 48' that surrounds the member 73, and hence into the gap 63, without the crown corks 3 becoming jammed against one another.

With the aid of manually detachable holding screws or similar fastening means 76, the plate 62 can be removed from the wheel 54, for example to correct disruptions, for cleaning purposes, etc.

As illustrated in FIG. 11, after the transition 70 the closure channel is first guided downwardly via a portion 77 that is curved in the shape of an arc. Adjoining the portion 77 is a turnover helix 78 through which correctly oriented crown corks pass without change and in which incorrectly oriented crown corks are turned over. Adjoining the turnover helix 78 is the portion 79 of the closure channel 68 that leads to the closure release position of the closing or capping machine.

During operation of the crown cork magazine 1d, those crown corks 3 that have passed into the gap 63 are carried along by the wheel 54, i.e. by the permanent magnets 68 that are provided on the flange 57, which wheel is rotated in the direction of the arrow D by the drive means 66; at the transition 70, these crown corks 3 are then guided by the guide surface 69' into the closure channel 68, with the respectively following crown corks 3 pushing the preceding crown corks further along until they have passed completely out of the effective range of the rotating permanent magnets 58 and into the closure channel 68. Due to the aforementioned special configuration of the guide surface 69', such an operation can be carried out at a high output rate without disruption. With the crown cork magazine 1d, the wheel 54, the disk or plate 62, and the guide piece 69 form the essential elements of the device 10e for introducing the crown corks 3 out of the magazine chamber 48 and into the closure channel 68.

In FIG. 10, the reference numeral 80 indicates a line that during cleaning (cleaning in place or CIP cleaning) of the crown cork magazine 1d serves for the supply of a cleaning fluid, with the end of the line 80 having an outlet opening 81 for such fluid. In the illustrated embodiment, the outlet opening 81 is provided in the region of the axis 53 across from the base of the frustoconical or cup-shaped member 73.

During cleaning, the fluid that exits the opening 81 cleans the chamber 48', the other surface 62' of the plate 62, as well as in particular also all of the surfaces of the gap 63. The cleaning fluid can pass through a gap between the peripheral surface of the plate 62 and the inner surface of the housing 60, and can drain into a non-illustrated collecting means disposed below the housing 60.

By means of the ribs 59, but also via the bolts 61, rotation of the wheel 54 results in a loosening of the crown corks 3 within the chamber 48', thereby ensuring that a sufficient number of crown corks 3 can always pass into the gap 63.

Figure 13:
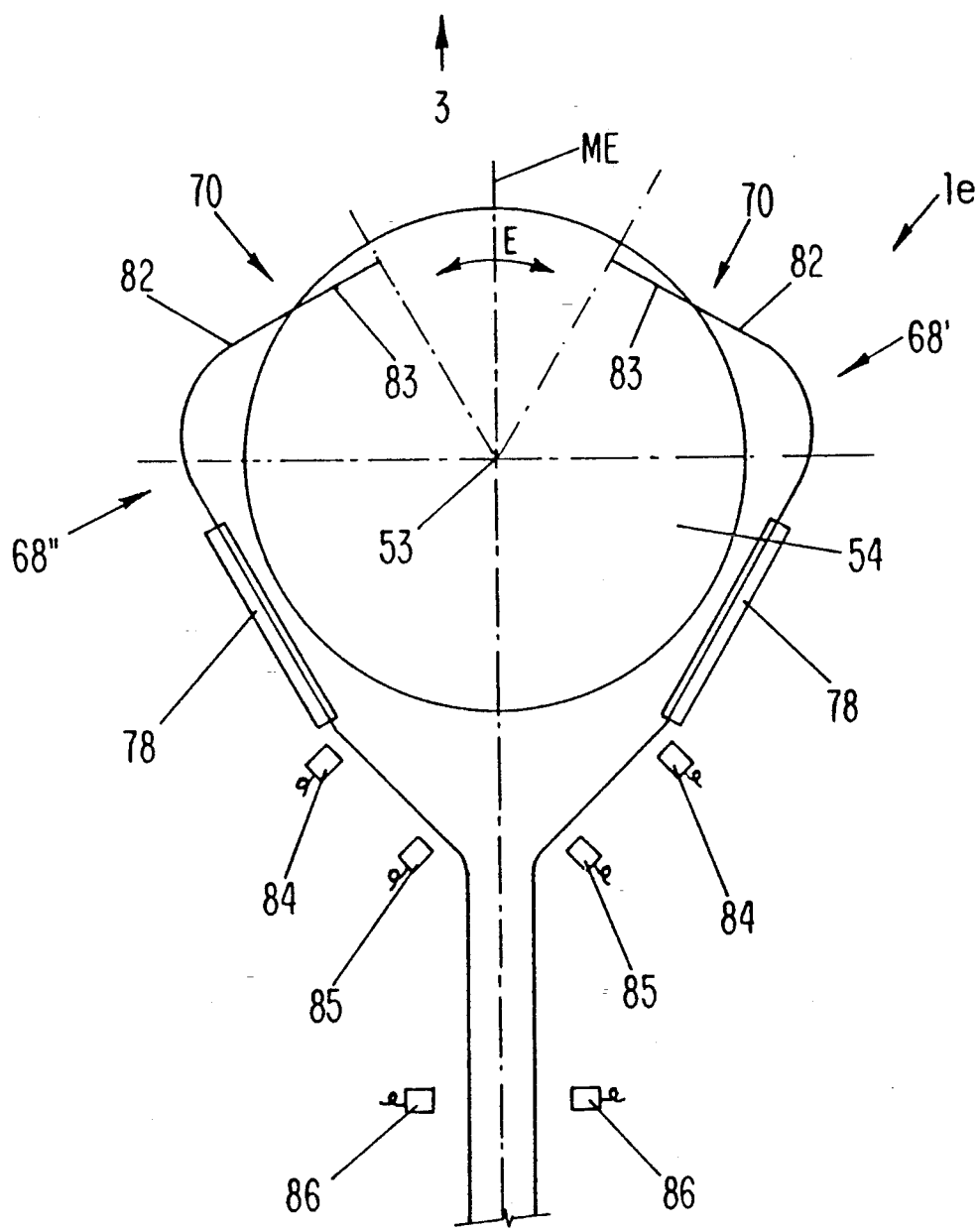
FIG. 13 is a schematic view of a further exemplary embodiment of the present invention as a modification of the crown cork magazine of FIGS. 10–12.

FIG. 13 shows a crown cork magazine 1e that differs from the crown cork magazine 1d merely in that instead of a single closure channel 68, two closure channels 68' and 68" are provided, and in particular are disposed on both sides of an imaginary vertical central plane ME that includes the axis 53. At the transition 70, each closure channel 68' and 68", with respect to the therelocated portion 68, which corresponds to the portion 77, and the guide piece 83, which corresponds to the guide piece 69, is pivotable radially outwardly out of a position in which the guide piece 83 is disposed in the path of movement of the crown corks 3 that are carried along by the wheel 54, into a non-effective position in which the guide piece 83 is disposed beyond the path of movement of the crown corks that are carried along by the wheel 54. Furthermore, the crown cork magazine 1e differs from the crown cork magazine 1d in that the drive means 66 of the wheel 54 can be driven in both directions (double arrow E).

The crown cork magazine 1e is operated, for example, in such a way that the closure channel 68" is not used until a disruption occurs in the normally utilized closure channel 68'. When this magazine is put into operation, the closure channel 68" is first filled with crown corks 3. For this purpose, the portion 82 of the closure channel 68' is pivoted into the operative position and the portion 82 of the closure channel 68' is pivoted into the non-operative position. In the embodiment illustrated in FIG. 13, the wheel 54 is driven in a counter clockwise direction by the drive means 66 When the closure channel 68" is sufficiently filled with crown corks 3, the portion 62 of this channel is pivoted into the nonoperative position and the portion 82 of the closure channel 68' is pivoted into the operative position. By means of the wheel 54, which is now driven in a clockwise direction, the crown corks 3 are supplied to the closure channel 68' and are fed thereby to the closure release position of the closing or capping machine.

If disruptions occur, a switch is immediately made to the closure channel 68", in other words, the supplying of crown corks can be effected via this closure channel without interruption, since it is already filled with crown corks 3.

For control and monitoring purposes, provided on each closure channel 68' and 68", below the turnover helixes 78, are respectively three sensors 84, 85 and 86. The sensor 84 immediately follows a turnover helix 78 the sensor 86 is disposed in the lower portion of the closure channel 68' or 68" shortly ahead of the closure release position and prior to a non-illustrated blocking means, and the sensor 85 is disposed between the sensors 84 and 86. Control of the sensors 84–86, which are preferably proximity switches, is effected in such a way that the drive means 66 for the wheel 54 is always turned on when the sensor 85 in the closure channel 68' or 68" that is being used no longer senses the presence of crown corks 3. The drive means 66 is turned off when the sensor 85 continuously senses the presence of crown corks.

The sensor 86 monitors the movement of crown corks 3 in the lower portion of the closure channel 68' or 68", i.e. when the sensor 86 in the closure channel that is being utilized no longer senses that any crown corks are passing by, a disruption has occurred and the sensor 86 releases an appropriate signal. Sensors 84-86 could also be provided on the channel 68.

Figure 14:
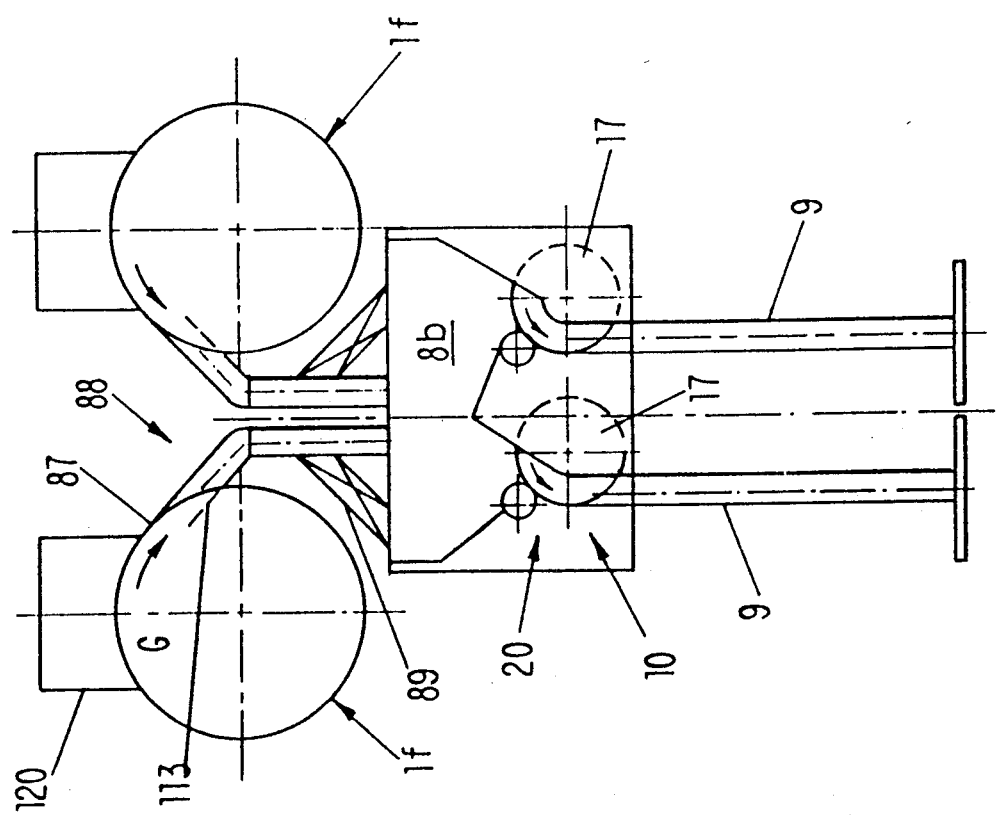

FIG. 14 shows an arrangement that comprises two crown cork magazines 1f and a common collection chamber 8b for both magazines. The outlets 87 of the two cork magazines 1f are connected to the collection chamber 8b via a respective vertical closure channel 88, which is also provided with a turnover helix 89. The collection chamber 8b has two outlets, each of which is adjoined by a vertical closure channel 9. A respective device 10 is provided at the transition 20 between the collection chamber and a closure channel 9, and in particular in such a way that the members 17 of these devices rotate in the same direction.

During operation, for example, one crown cork magazine 1f as well as one closure channel 9 are used. If, for example, disruptions occur in this closure channel 9, a switch is made to the other closure channel 9, and in particular in a controlled manner via non-illustrated sensors that detect the crown corks 3 as well as closing means on the closure channels 9. If, for example, a disruption occurs in the crown cork magazine 1f that is being used or in the pertaining closure channel 88, or if the crown cork magazine 1f that is being used is empty, a switch is similarly made in a sensor-controlled manner to the other crown cork magazine 1f. At higher outputs, it is also possible to operate both crown cork magazines 1f in parallel.

In the arrangement of FIG. 14, each of the two crown cork magazines 1f has only a single conveying direction.

Figure 15:
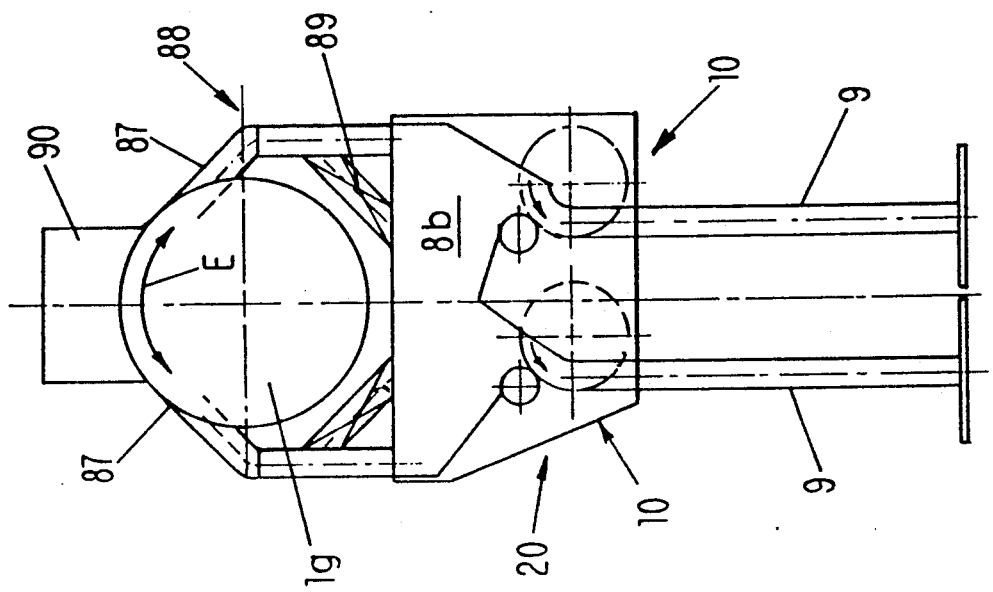
FIGS. 14 and 15 show arrangements similar to FIG. 13, and comprise either two or one crown cork magazine, an adjoining collection chamber and two adjoining vertical closure channels.

FIG. 15 shows an arrangement where from a structural standpoint the cork magazine 1g largely corresponds to the cork magazine 1f, yet similar to the cork magazine 1e has two outlets 87 and a reversible conveying direction, as indicated in FIG. 15 by the double arrow E. Connected to each outlet 87 is a closure channel 88 that has a turnover helix 89. The closure channels open out into the collection chamber 8b to which are again connected the two closure channels 9, and in particular via the device 10 that is provided at the transitions 20.

It is to be understood that with the arrangements illustrated in FIGS. 14 and 15, it would also be possible, in place of the devices 10, to use other devices, for example the devices 10b or 10e, to transfer the crown corks 3 out of the collection chamber 8b and into the respective closure channel 9.

Both of the cork magazines 1f and 1g have at the top a respective chute-like auxiliary magazine, i.e. an appropriate emergency container 90, that is open at the top and that during normal operation is empty or nearly empty. During disruptions, or if the crown corks 3 that are being conveyed at the outlet 87 of the cork magazine 1f or 1g that is being used cannot be withdrawn or cannot be withdrawn in a sufficient quantity via the closure channel 88, the pertaining emergency container 90 can accommodate a certain number of crown corks. In this connection, the containers 90 are embodied in such a way that the crown corks 3 have and maintain the same orientation in these containers that is required for entry into the closure channel 88. This has the advantage that the crown corks 3 that are present in the emergency container 90 can be immediately conveyed on into the closure channel 88 without delay when the disruption is eliminated. The emergency container 90 preferably has a closed configuration.

Figure 16:
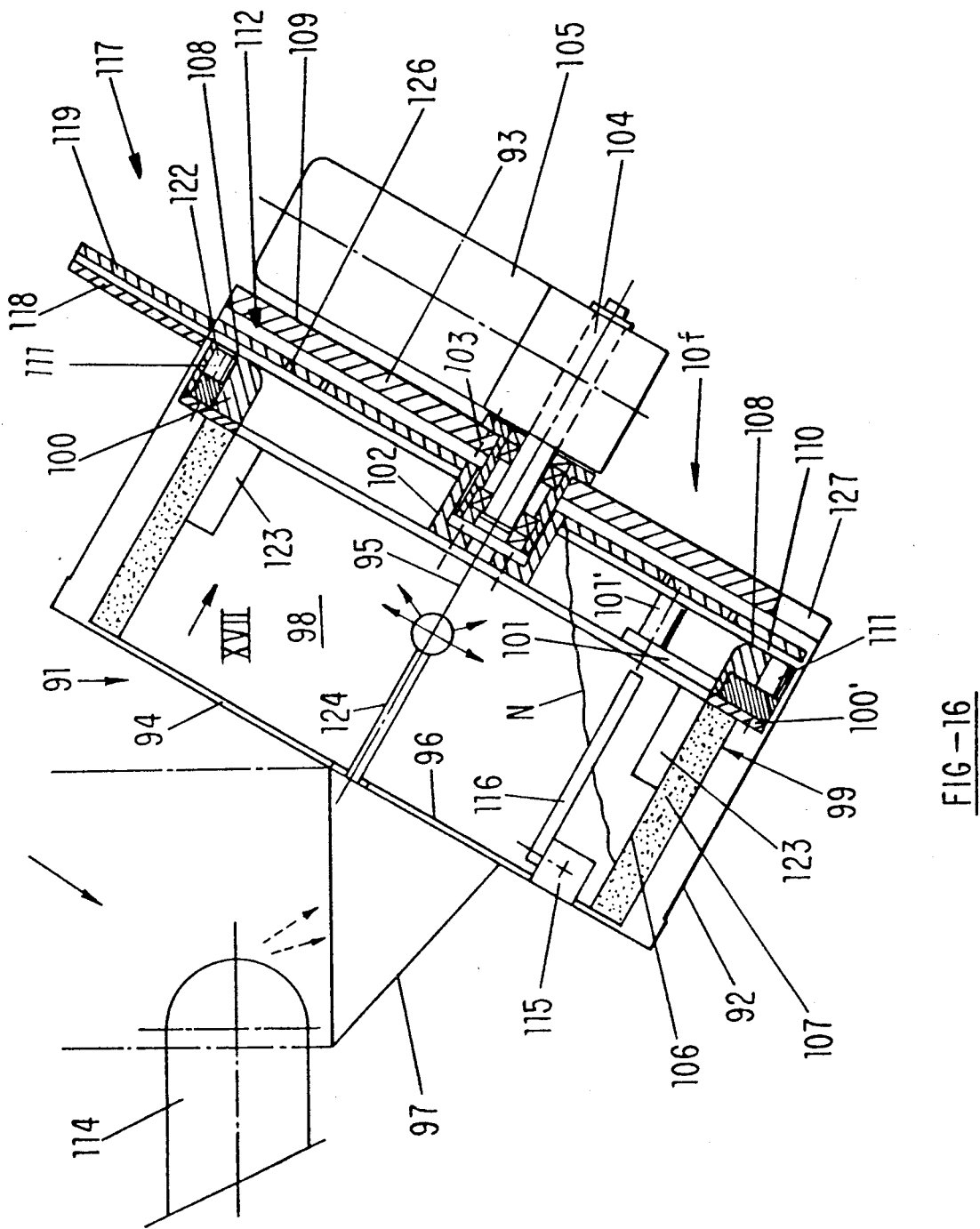
FIG. 16 is a cross-sectional view in greater detail of a crown cork magazine for use with the arrangements of FIGS. 14 and 15.

The cork magazine 1f illustrated in detail in FIG. 16 comprises, among other things, a housing 91 having a circular cylindrical peripheral wall 92, a base formed by plate 93, as well as an upper end wall 94. With the aid of the plate 93, the housing 91 is secured to a stationary part of a closing or capping machine in such a way that the axis 95 of the housing 91 is inclined relative to the vertical. There is provided in the upper end wall 94 an opening 96 on which, toward the outside, is provided a feed hopper for filling crown corks 3 into a magazine chamber 98 that is formed within the housing 91, and in particular within a drum 99 that has an open upper and lower side and is mounted in the housing 91 in such a way as to be rotatable about its central axis, which is disposed coaxially with the axis 95. The drum 99 comprises a circular ring 100 that concentrically surrounds the axis 95 and has an axially outwardly disposed surface that is adjacent to yet slightly spaced from the inner surface of the peripheral wall 92. That side of the ring 100 that is remote from the plate 93 is provided with a plurality of, for example four, spokes 101 that are uniformly distributed about the axis 95 and radially thereto.

In the illustrated embodiment, the ring 100 is integrally produced with the spokes 101, the radially outwardly disposed ends of which merge into the ring 100, with the radially inwardly disposed ends of the spokes 101 respectively being secured to one end of a spacer pin 101'. These spacer pins are disposed at the same radial distance from the axis 95, and their axes extend parallel to the axis 95. At the other end, each spacer pin 101' is secured to a disk or similar member 109, the axis of which is coaxial with the axis 95. By means of a hub 102, the member 109 is secured to one end of a shaft 104, which is rotatably mounted in a bearing means 103 on the plate 93 so as to be coaxial with the axis 95. The other end of the shaft 104 projects beyond the outer surface of the plate 93 that is remote from the magazine chamber 98, where it is drivingly connected to a drive means 105.

An auxiliary ring 100' is held on that side of the ring 100 remote from the plate 93 in any suitable manner, for example via non-illustrated screws. The auxiliary ring 100' concentrically surrounds the axis 95, with the inner circular annular surface of the auxiliary ring 100' being flush with the corresponding inner annular surface of the ring 100. A round or ring-shaped wall element 106 is secured to the auxiliary ring 100'. with this wall element 106 also concentrically surrounding the axis 95. The radially inwardly disposed surface of the wall element 106 is aligned with the radially inwardly disposed surfaces of the ring 100 and of the ring 100'. That rim of the wall element 106 that is remote from the ring 100 extends to the region of the end wall 94, with this rim actually being slightly spaced from the inner surface of the end wall 94. In the illustrated embodiment, the wall element 106 has a double-walled construction and forms a chamber 107 that is completely closed toward the outside; this chamber 107 is filled with a material for noise dampening, i.e. with an anti-drone material. In the illustrated embodiment, the chamber 107 is filled, for example, with sand. Instead of the double-walled construction of the wall element 106, it is also possible to provide an appropriate, single-layer wall element, the outer surface of which is provided with a coating and/or sheathing of noise dampening or anti-drone material. This coating or sheathing is then formed with a relatively high specific weight for example using an elastic or rubber-like material (for example rubber or plastic).

The member 109, which has a circular peripheral surface, is secured to the hub 102 across from, and spaced from, the end face 108 of the ring 100 that faces the plate 93. The circumferential surface of the member 109 extends to the region of the inner surface of the peripheral wall 92, i.e. the peripheral surface of the member 109 is spaced slightly from the inner surface of the peripheral wall 92. As can also be seen from FIG. 16, the bearing means 103, as viewed from the magazine chamber 98, is completely covered by the hub 102 and the member 109.

Due to the distance or spacing between the end face 108 and the flat side of the member 109 that faces the end face 108, there is formed in the vicinity of the end face 108 an annular gap 110 that corresponds to the gap 63. The axial width of the gap 110 in a direction parallel to the axis 95 is somewhat greater than the height of the crown corks 3, but in any case is less than the diameter of these crown corks 3, with the radial width of the gap 110 being somewhat greater than the diameter of the crown corks 3.

A plurality of permanent magnets 111 having the same radial distance from the axis 95 are provided on the ring 100; these permanent magnets 111 are also distributed at uniform angular spacings about the axis 95. The permanent magnets 111, which are respectively effective at the end face 108, are radially spaced from the axis 95 by such a distance that the central axes of the permanent magnets 111, which axes are disposed parallel to the axis 95, rotate about a circular path of movement that concentrically surrounds the axis 95 and is spaced from the inner surface of the peripheral wall 92 by a distance that is less than half of the diameter of the crown corks 3.

The outlet 87 is formed in the upper region of the path of movement along which the permanent magnets 111, i.e. the central axes thereof, rotate, i.e. at the transition 112 that is disposed there: in other words, at this location the closure channel 88, which again has a rectangular inner cross-sectional configuration, opens out tangentially into the gap 110. At the outlet 87, the two larger cross-sectional sides of the closure channel are approximately aligned with the end face 108, i.e. with that surface of the member 109 that faces this end face 108. At the outlet 87, one of the two narrower cross-sectional sides is approximately aligned with the outer boundary surface of the gap 110, i.e. with the inner surface of the peripheral wall 92. The other of the two narrower cross-sectional sides of the closure channel 88, at the outlet 87, i.e. at the transition 112, is offset radially inwardly relative to the axis 95, and in particular is approximately aligned with the radially outwardly disposed side or guide surface of a guide piece 113 that corresponds to the guide piece 69. The guide piece 113 is preferably identical to the guide piece 69.

During operation of the cork magazine 1f, a sufficient number of non-oriented crown corks 3 are present in the lower portion of the magazine chamber 98. In particular due to the funnel-shaped structure formed by the drum 99 and the plate 109 due to the inclination of the axis 95, a certain number of crown corks 3 pass into the gap 110 when the drum 99 and member 109 are driven about the axis 99 via the drive means 105 in the direction of the arrow G (FIG. 14). These crown corks 3 are carried along by the permanent magnets 111 that are provided on the ring 100 and then pass into the closure channel 88 at the transition 112.

During operation, the magazine chamber 98 is constantly refilled with crown corks via the opening 96 and the feed hopper 97, and in particular utilizing, for example, a conveyor belt-like feed mechanism 114. The supply of crown corks 3 to the magazine chamber 98 is monitored via a sensor or signal emitter 115 that in the illustrated embodiment is constructed as a switch that is provided with an arm 116 and always turns off the drive means for the feed mechanism 114 when the non-oriented quantity of crown corks 3 present in the magazine chamber 98 has reached a level N, and then again turns the drive means for the feed mechanism 114 on when the level of crown corks 3 drops below the level N by a prescribed amount.

In the upper region and in the direction of rotation G partially prior to the transition 112, yet at least partially in the region of the guide piece 113, there is provided on the outer surface of the housing 91, i.e. on the peripheral wall 92, the aforementioned emergency container 90. This container essentially comprises a chute 117 that is formed between two spaced apart plates 118 and 119 and is completely closed off towards the outside. The two plates 118 and 119, which extend radially beyond the outer surface of the peripheral wall 92, are respectfully disposed in planes that extend perpendicular to the axis 95, and in particular in such a way that that surface of the plate 118 that delimits the chute 117 is disposed approximately in the plane of the end face 108 of the ring 100, and that surface of the plate 119 that delimits the chute 117 is disposed approximately in the plane of that side of the member 109 that faces the ring 100. The width of the chute 117 taken in an axial direction parallel to the axis 95 is equal to the corresponding width of the gap 110.

Figure 17:
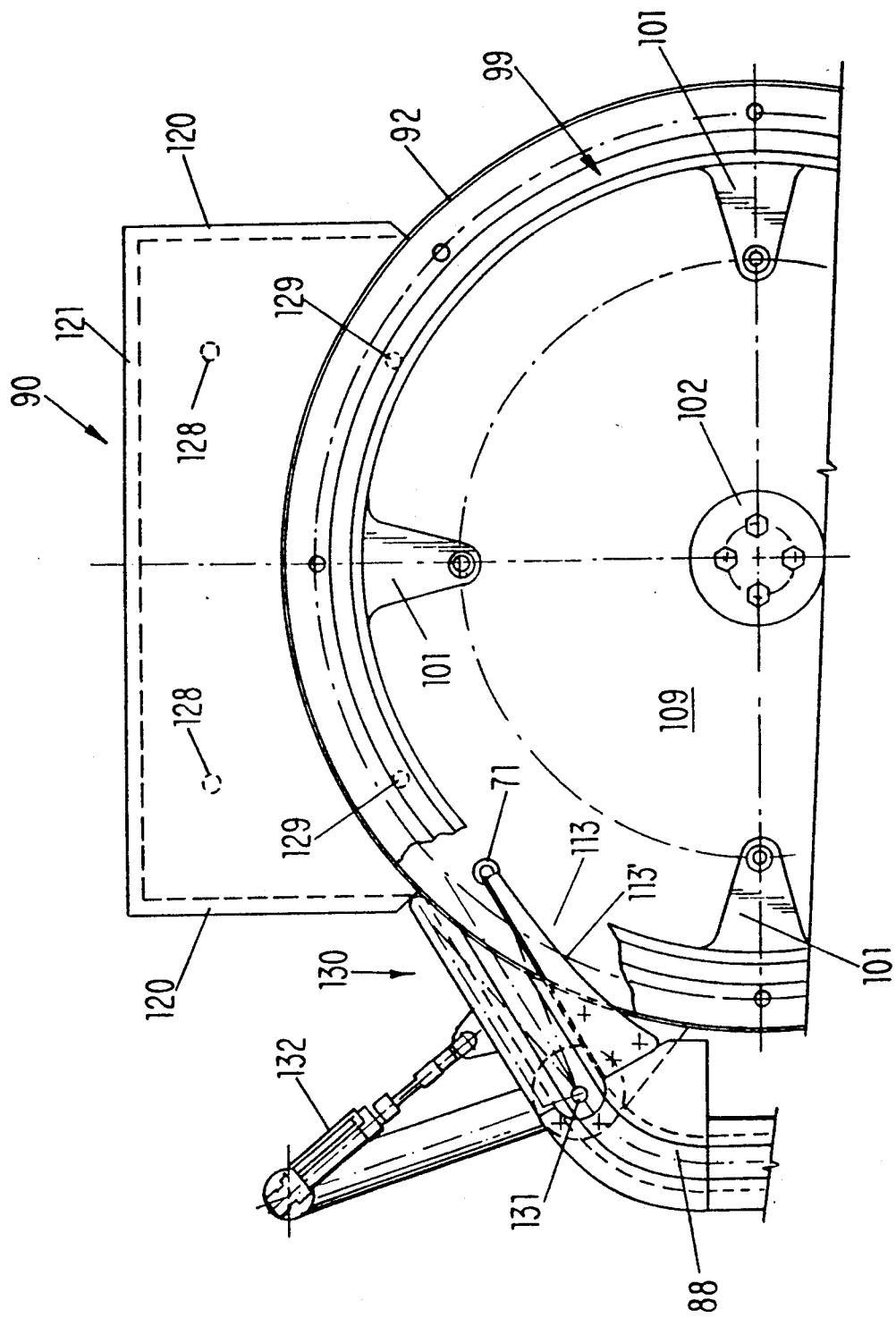
FIG. 17 is a view of the crown cork magazine taken in the direction of the arrow XVII in FIG. 16.

As can be seen from FIGS. 16 and 17, the chute 117, which has a rectangular cross-sectional configuration, has a width when viewed in the direction of rotation G that is many times greater than the distance between the two plates 118 and 119. At the two narrow sides, which are offset relative to one another in the direction of rotation G, the chute 117 is closed off by respective wall portions 120, and at the radially outwardly disposed upper side is closed off by a wall portion 121.

In the region of the emergency container 90, the peripheral wall 92 is provided with a slot 122 that extends concentric to the axis 95 and via which the entire width of the chute 117 communicates with the gap 110, so that in the manner described above, if disruptions occur o delays occur during removal of the crown corks 3 via the closure channel 88, excess crown corks 3 can be accommodated by the emergency container 90, i.e. by the chute 117 located there, and in particular in such a way that the orientation that the crown corks 3 had in the gap 110 is not lost.

In order to achieve a loosening of the crown corks in the magazine chamber 98, rib or vane-like elements 123 are provided on the inside of the drum 99, and in particular on the inner surface of the wall element 106, at that location where the wall element 106 merges with the ring 100. The vane-like elements 123 are also respectively connected to a spoke 101, and thus additionally effect a mechanical reinforcement of the drum 99.

Also illustrated in FIG. 16 is a line 124 that serves for supplying a cleaning fluid during cleaning (CIP cleaning) of the crown cork magazine 1f. At an end disposed in the magazine chamber 98 in the vicinity of the axis 95, the line 124 has a spray head 125 that is provided with a plurality of spray or discharge openings, especially for a radial discharge of the cleaning fluid as well as for a discharge that is directed against the member 109. In order to also be able to clean the back side of the member 109 as well as that side of the plate 93 that faces the member 109, the member 109 is provided with openings or passages 126. The member 109 can also be manufactured from a perforated material.

With the crown cork magazine 1f, the drum 99, the member 109, and the guide piece 113 form the essential elements of the device 10f for introducing the crown corks 3 into the closure channel 88 from the magazine chamber 98. To withdraw the cleaning fluid, the housing 99 additionally has an opening 127 in the lower portion of the plate 93.

In the region of the emergency container 90, four further nozzles or jets are provided for the cleaning (CIP cleaning). In particular, two jets 128 are provided that have their discharge openings disposed in the interior of the chute 117 in the vicinity of the radially outwardly disposed, closed end (wall portion 121) of this chute 117. Also provided are two jets 129, which are disposed on the plate 93 in the vicinity of the slot 122 in such a way that the discharge openings thereof are directed against the back side of the member 109. The jets 128 essentially serve for cleaning the chute 117, while the jets 129 serve for cleaning the back side of the member 109.

In the illustrated embodiment, the guide piece 113 is part of a closure channel element 130 that forms the closure channel 88 at the outlet 87 and that is pivotable about an axis 131 that extends parallel to the axis 95 and is disposed radially beyond the peripheral wall 92 of the housing 91. With the aid of an adjustment member, which in the illustrated embodiment is formed by a pneumatic cylinder 132, the closure channel element 130 can be pivoted about the axis 131 out of the operative position of the guide piece 113 illustrated in FIG. 17, in which position this guide piece 113 extends into the gap 110 and thereby guides the crown corks 3 that are carried along by the permanent magnets 111 via the closure channel element 130 into the adjoining closure channel 88, and into a position in which the guide piece 113 is disposed radially beyond the gap 110 and hence is inoperative. In this inoperative position, a radially inwardly disposed convexly curved surface 113' that has the shape of a circular arc, with this surface being part of the guide piece 113 and being viewed relative to the axis 95, forms the continuation of the inner surface of the peripheral wall 92 and hence forms a part of the guide surface for the crown corks 3 that are carried along by the permanent magnets 111. It is to be understood that the slot 122 also extends in the region of the guide piece 113, i.e. the latter is pivotable through this slot out of the inoperative position into the operative position.

To hold the permanent magnets 111, the ring 100 is provided with a plurality of blind holes, the axes of which respectfully extend parallel to the axis 95, with the blind holes being open toward that side of the ring 100 that is remote from the member 109. After the permanent magnets 111 have been placed into the blind holes, the magnets are held by the auxiliary ring 100'.

Common to all of the devices 10, 10a-10f is that although they have a relatively straightforward construction, a reliable mode of operation is achieved that, in particular even with a low noise level, avoids abrasion of the crown corks and hence prevents a formation of dust and dirt. A further advantage is that at the transitions between a closure channel and the preceding chamber, for example the magazine chamber 2 or collection chamber 8 or 8a, to a large extent smooth through-passages are achieved. This is particularly true also for the devices 10b and 10c.

When using the inventive device, a CIP cleaning of the crown cork magazine is possible due to the smooth through-passages as well as due to the fact that structure that extends into the crown cork conveying region is avoided.

Figure 18:
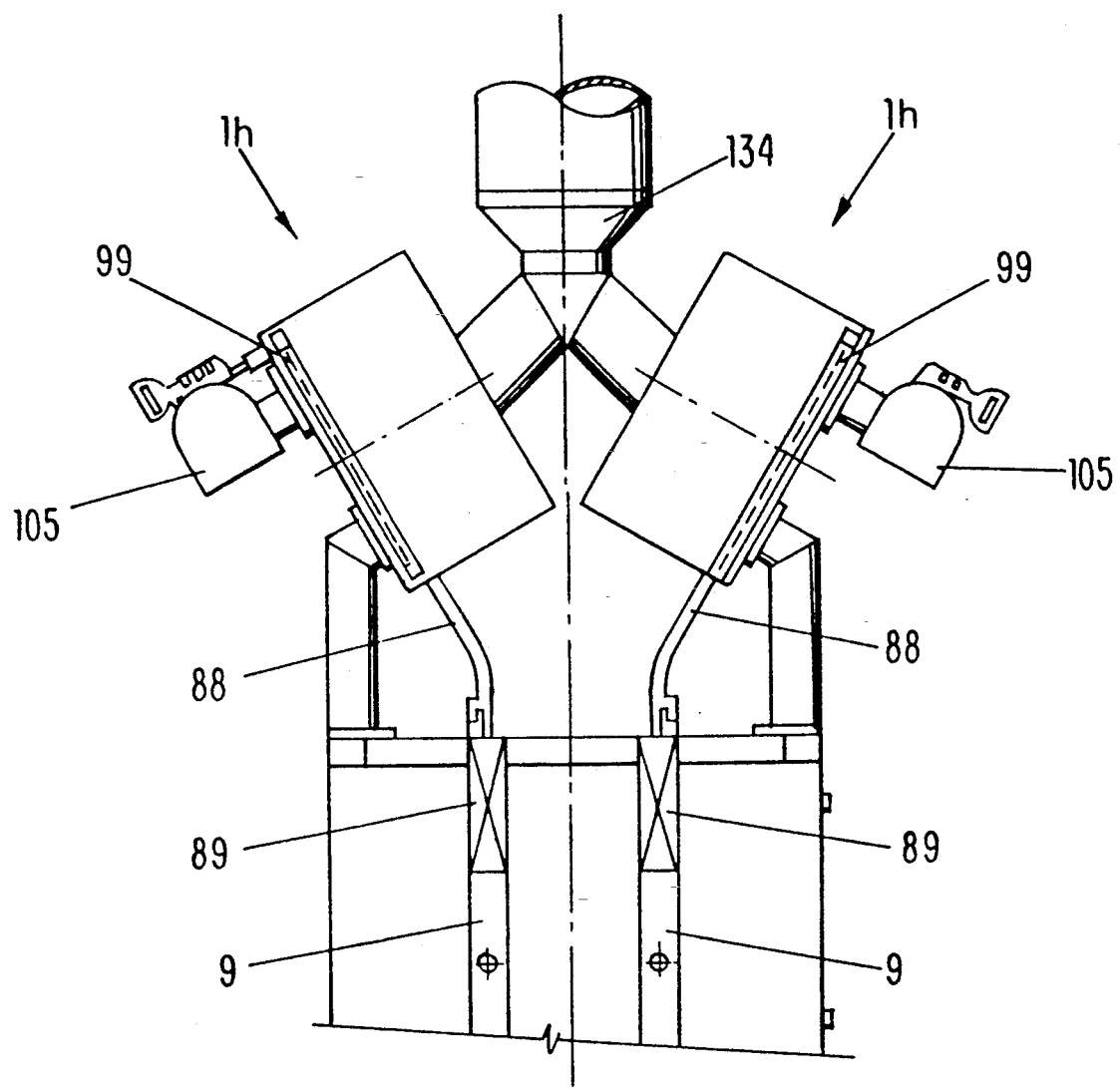
FIG. 18 is a schematic view of an arrangement showing two crown cork magazines and the pertaining closure channels.

FIG. 18 shows an arrangement that comprises two cork magazines 1h, the configuration of which corresponds, for example, to the device 10f of FIGS. 16 and 17, and each of which has a drum 99 for the closures 3.

Associated with each magazine 1h is a closure channel 88 having a turnover helix 89. The closure channel leads to a non-illustrated collection chamber. The special feature of this embodiment is that the two crown cork magazines 1h, i.e. their drums 99, have their open sides facing one another, and can therefore be supplied with the closures 3 via a common chute 134. The two magazines 1h are, for example, controlled by a control mechanism in such a way that only one magazine is effective and the other magazine 1h is then activated when the one magazine is empty or is a magazine where the pertaining closure channel, etc. has a defect.

The present invention has been described in conjunction with specific embodiments. It is to be understood that alterations as well as further modifications are possible without thereby deviating from the basic inventive concept. For example, it would be possible instead of or in addition to the wheel 23 or the sector-shaped element 27 to provide other mechanical elements and/or at least one air discharge nozzle for loosening purposes. Furthermore, it is also possible to provide in the closure channels 5, 9, 29, 68, 68', 68'', 88, in the emergency container 90, as well as between the drum 99 and the housing 91 that surrounds this drum, and especially in the space formed between the plate 93 and the member 109, nozzles or jets that serve for the discharge of a cleaning fluid and that are provided with outlets for this fluid that are disposed at a lower level.

In FIG. 3, indicated by dashed lines is an element for loosening purposes that deviates from the wheel 23 and the sector-shaped element 27. This element is a disk 43 that can be rotated, and in particular in the direction of the arrow B', by a drive means, for example by the drive means 19, about an axis 44 that extends parallel to the axis 16. An end face or disk face of the disk 43 is disposed in the same plane as the end face 17' of the disk or member 17. Distributed at uniform angular spacings about the periphery of the disk 43 are a plurality of permanent magnets 45, the size and shape of which correspond to the permanent magnets 21; the axes of the permanent magnets 45 extend parallel to the axis 44. In place of the wheel 23, this embodiment then provides a fixed configuration, i.e. the edge 14' merges into the one cross-sectional side 9'' of the closure channel 9 via a curved portion having the shape of an arc. The axis 44 of the disk 43 is disposed in such a way that the permanent magnets 45 move along a circular path of movement 46 that extends partially in the region of the chamber 8 and partially in the region of the plate 14, whereby at the portion of the path of movement 46 that extends in the region of the chamber 8 the permanent magnets 45 are moved in such a way that they exert upon the crown corks a conveying movement away from the transition 20 and into the chamber 8 that effects a loosening of the crown corks.

The present invention is, of course, in no way restricted to the specific disclosure of the specification and drawings, but also encompasses any modifications within the scope of the appended claims.

What I claim is:

1. A device, for use with a closure magazine of a capping machine, for introducing closures into a closure channel from a chamber that accommodates a plurality of said closures, with said closures being crown corks of ferromagnetic material and having a cap-like shape with a closed side and an open side, and with said closures being conducted in said closure channel in a successive manner and in single file, said device further comprising:

at least one magnetic conveying means that, at least at a transition formed partially in said chamber and partially in an entry region of said closure channel, exerts via a moving magnetic field, a conveying effect upon said closures in a first conveying direction for introducing said closures into said closure channel, whereby said magnetic field moves along a path of movement that is curved about an axis, and said chamber at least at said transition, is bounded by at least one first abutment and guide surface against which said open or said closed sides of said closure rest, with said first abutment and guide surface being disposed in a plane that extends perpendicular to said axis of said path of movement of said magnetic field, whereby said plane of said first abutment and guide surface as well as a plane of said path of movement of said magnetic field are disposed at an angle relative to a horizontal direction; and an element that is rotatably driven about said axis of said path of movement of said magnetic field and is in the form of one of the group consisting of disks, rings, wheels, and drums, with said element forming said first abutment and guide surface, and with said element, for providing said magnetic field, carrying at least one magnet, preferably at least one permanent magnet, wherein said plane of said first abutment or guide surface and of said path of movement of said magnetic field forms with said horizontal direction an angle that is less than 90°, preferably an angle between approximately 55° and 65°, and preferably about 60°; wherein said transition is provided at an upper side of said chamber as viewed relative to said angle of inclination of said first abutment and guide surface; wherein said rotatable element is a drum that rotates about an axis thereof and forms said chamber, with said drum being provided with said first abutment and guide surface and said at least one magnet; wherein said path of movement of said at least one magnet is disposed within a second abutment and guide surface against which rims of said closures rest, with said second abutment and guide surface having the shape of a circular ring and surrounding said axis of said drum; wherein at said transition, said closure channel leads tangentially away from said second abutment and guide surface; wherein said drum has a base that is bounded by a plate or disk that rotates with said drum; and wherein at a periphery of said drum there is provided an annular channel that surrounds said axis of said drum, is open radially inwardly into said chamber, and is bounded radially outwardly by said second abutment and guide surface.

2. A device according to claim 1, wherein at said transition there is formed at least one emergency container for at least temporarily accommodating closures.

3. A device according to claim 1, which includes a plurality of said magnets for providing a rotating magnetic field, with said magnets having an effective diameter that is at most equal to a diameter of said closures, and with a center-to-center distance between adjacent ones of said magnets being at least equal to said diameter of said closures.

4. A device according to claim 1, wherein said magnetic conveying means includes at least one magnet arrangement for providing a moving magnetic field to provide said conveying effect.

5. A device according to claim 2, wherein said emergency container is provided with at least one preferably closed chute for the at least temporary accommodation of closures; and wherein said chute communicates with at least one of said chamber, an annular channel thereof, and said closure channel.

6. A device according to claim 1, wherein said chamber is formed by a hopper or drum; wherein said rotatable element is a disk that forms a base surface of said drum; wherein said path of movement of said at least one magnet is disposed within a second abutment and guide surface against which rims of said closures rest, with said second abutment and guide surface having the shape of a circular arc and extending about an axis of said disk; and wherein at said transition, said closure channel preferably leads tangentially away from said second abutment and guide surface.

7. A device according to claim 5, wherein said chute has an essentially rectangular cross-sectional configuration, with one dimension thereof being less than a diameter of said closures and preferably at least approximately equal to a height of said closures.

8. A device according to claim 1, wherein for a CIP cleaning of various components of said device, there is provided at least one discharge means for a cleaning fluid, and, at a lower level, withdrawal means for said fluid.

9. A device according to claim 1, wherein said drum is provided with a ring that rotates therewith and forms said first abutment and guide surface, whereby, when viewed in the direction of an axis of said ring, said plate or disk, which delimits said chamber, is disposed across and at a distance from said ring.

10. A device according to claim 9, wherein said ring is formed by a ring-shaped flange of a preferably cup-shaped wheel that has a central opening via which said chamber, which communicates with said annular channel, communicates with a magazine chamber to permit refilling with said closures.

11. A device according to claim 10, wherein, for loosening-up of said closures, projections are provided on one of said ring, said wheel, and said drum, with said projections preferably being in the form of ribs or vane-like elements.

12. A device according to claim 1, wherein said path of movement of said at least one magnet is radially spaced from said outwardly disposed second abutment and guide surface of said annular channel by a distance that is less than half of the diameter of said closures.

13. A device according to claim 1, wherein at said transition there is provided a guide piece having a guide surface that is disposed in said path of movement of said at least one magnet that carries said closure along, with said guide surface guiding said closures into said closure channel.

14. A device according to claim 13, wherein an end of said guide piece disposed in the vicinity of said path of movement of said at least one magnet is provided with a freely rotatable roller having a peripheral surface that merges with said guide surface.

15. A device according to claim 13, wherein said guide surface has a profile that includes a central projection that extends along said guide surface and forms an abutment surface for said closures, preferably an abutment surface for a smooth peripheral portion of said closures, which are in the form of crown corks.

16. A device according to claim 1, wherein at said transition, said chamber is bounded by inner surfaces of at least two spaced-apart wall means that at said transition each form one of said first abutment and guide surfaces for said closed side or said open side of said closures, and that respectively merge into a larger cross-sectional side of said closure channel, which has a rectangular cross-sectional configuration; wherein at said transition, said chamber has a base portion that is convexly curved in a direction toward an interior of said chamber, and that forms a second abutment and guide surface for a rim of said closures, with said base portion merging into one of two narrower cross-sectional sides of said closure channel; and wherein a projection of said base portion onto a plane of said path of movement of said magnetic field is, at least at said transition, surrounded by said path of movement.

17. A device according to claim 16, wherein said axis of said path of movement is disposed below said base portion.

18. A device according to claim 16, wherein at said transition between said chamber and said entry region of said closure channel there is provided a mechanism for loosening-up a stream of said closures, with said mechanism being disposed beyond a region surrounded by said path of movement of said magnetic field.

19. A device according to claim 18, wherein said mechanism is formed by a rotatably driven element or by an element that can be moved back and forth or pivoted by a drive means.

20. A device according to claim 1, wherein two closure channels adjoin said chamber, whereby said device has two sets of components that are mirror symmetrical to a central plane that extends between said channels.

21. A device according to claim 1, wherein two closure channels adjoin said chamber, and wherein means are provided for altering said first conveying direction for selectively filling one or the other of said closure channels with said closures via said magnetic conveying means.

22. A device according to claim 1, wherein along a longitudinal direction of said closure channel there are successively provided at least two sensors each of which delivers an electrical control signal, with a first one of said sensors, which is disposed the closest to said transition, acting as a limit switch to stop said conveying means when it senses the presence of closures, and with a second one of said sensors, which follows said first sensor in a direction toward said closure channel, starting said conveying means when it does not sense the presence of closures.

23. A device according to claim 22, wherein a third sensor is provided that delivers a signal to indicate the presence of a disruption when it does not sense the presence and/or movement of closures.

24. A device according to claim 1, wherein said drum is at least partially accommodated in a housing.

25. A device according to claim 13, which includes means for moving, preferably via a pivoting movement, said guide piece out of an operative position and into a non-operative position.

26. A device according to claim 1, wherein disposed across from one another are two drums, each of which forms a chamber for said closures, and each of which has at least one closure channel; wherein a single mechanism that is common to both of said drums is provided for supplying closures to said drums; and wherein means are provided for selectively activating said magnetic conveying means of one or the other of said drums.

27. A device according to claim 5, wherein said chute of said emergency container has an opening that communicates with said annular channel.

28. A device, for use with a closure magazine of a capping machine, for introducing closures into a closure channel from a chamber that accommodates a plurality of said closures, with said closures being crown corks of ferromagnetic material and having a cap-like shape with a closed side and an open side, and with said closures being conducted in said closure channel in a successive manner and in single file, said device further comprising:

at least one magnetic conveying means that, at least at a transition formed partially in said chamber and partially in an entry region of said closure channel, exerts, via a moving magnetic field, a conveying effect upon said closures in a first conveying direction for introducing said closures into said closure channel, whereby said magnetic field moves along a path of movement that is curved about an axis, and said chamber, at least at said transition, is bounded by at least one first abutment and guide surface against which said open or said closed sides of said closure rest, with said first abutment and guide surface being disposed in a plane that extends perpendicular to said axis of said path of movement of said magnetic field, whereby said plane of said first abutment and guide surface as well as a plane of said path of movement of said magnetic field are disposed at an angle relative to a horizontal direction;

an element that is rotatably driven about said axis of said path of movement of said magnetic field and is in the form of one of the group consisting of disks, rings, wheels, and drums, with said element forming said first abutment and guide surface, and with said element, for providing said magnetic field, carrying at least one magnet, preferably at least one permanent magnet; and at said transition, a guide piece having a guide surface that is disposed in said path of movement of said at least one magnet that carries said closure along, with said guide surface guiding said closures into said closure channel, wherein an end of said guide piece disposed in the vicinity of said path of movement of said at least one magnet is provided with a freely rotatable roller having a peripheral surface that merges with said guide surface.

29. A device according to claim 28, wherein said plane of said first abutment or guide surface and of said path of movement of said magnetic field forms with said horizontal direction an angle that is less than 90°, preferably an angle between approximately 55° and 65°, and preferably about 60°; and wherein said transition is provided at an upper side of said chamber as viewed relative to said angle of inclination of said first abutment and guide surface.

30. A device according to claim 29, wherein said rotatable element is a drum that rotates about an axis thereof and forms said chamber, with said drum being provide with said first abutment and guide surface and said at least one magnet; wherein said path of movement of said at least one magnet is disposed within a second abutment and guide surface against which rims of said closures rest, with said second abutment and guide surface having the shape of a circular ring and surrounding said axis of said drum; wherein at said transition, said closure channel leads tangentially away from said second abutment and guide surface; and wherein said drum has a base that is bounded by a plate or disk that rotates with said drum.

31. A device according to claim 30, wherein at a periphery of said drum there is provided an annular channel that surrounds said axis of said drum, is open radially inwardly into said chamber, and is bounded radially outwardly by said second abutment and guide surface.

32. A device, for use with a closure magazine of a capping machine, for introducing closures with a closure channel from a chamber that accommodates a plurality of said closures, with said closures being crown corks of ferromagnetic material and having a cap-like shape with a closed side and an open side, and with said closures being conducted in said closure channel in a successive manner and in single file, said device further comprising:
  at least one magnetic conveying means that, at least at a transition formed partially in said chamber and partially in an entry region of said closure channel, exerts, via a moving magnetic field, a conveying effect upon said closures in a first conveying direction for introducing said closures into said closure channel, whereby said magnetic field moves along a path of movement that is curved about an axis, and said chamber, at least at said transition, is bounded by at least one first abutment and guide surface against which said open or said closed sides of said closure rest, with said first abutment and guide surface being disposed in a plane that extends perpendicular to said axis of said path of movement of said magnetic field, whereby said plane of said first abutment and guide surface as well as a plane of said path of movement of said magnetic field are disposed at an angle relative to a horizontal direction, wherein disposed across from one another are two drums, each of which forms a chamber for said closures, and each of which has at least one closure channel; wherein a single mechanism that is common to both of said drums is provided for supplying closures to said drums; and wherein means are provided for selectively activating said magnetic conveying means of one or the other of said drums.

33. A device, for use with a closure magazine of a capping machine, for introducing closures into a closure channel from a chamber that accommodates a plurality of said closures, with said closures being crown corks of ferromagnetic material and having a cap-like shape with a closed side and an open side, and with said closures being conducted in said closure channel in a successive manner and in single file, said device further comprising:
  at least one magnetic conveying means that, at least at a transition formed partially in said chamber and partially in an entry region of said closure channel, exerts, via a moving magnetic field, a conveying effect upon said closures in a first conveying direction for introducing said closures into said closure channel, whereby said magnetic field moves along a path of movement that is curved about an axis, and said chamber, at least at said transition, is bounded by at least one first abutment and guide surface against which said open or said closed sides of said closure rest, with said first abutment and guide surface being disposed in a plane that extends perpendicular to said axis of said path of movement of said magnetic field, whereby said plane of said first abutment and guide surface as well as a plane of said path of movement of said magnetic field are disposed at an angle relative to a horizontal direction, wherein at said transition, said chamber is bounded by inner surfaces of at least two spaced-apart wall means that at said transition each form one of said first abutment and guide surfaces for said closed side or said open side of said closures, and that respectively merge into a larger cross-sectional side of said closure channel, which has a rectangular cross-sectional configuration; wherein at said transition, said chamber has a base portion that is convexly curved in a direction toward an interior of said chamber, and that forms a second abutment and guide surface for a rim of said closures, with said base portion merging into one of two narrower cross-sectional sides of said closure channel; and wherein a projection of said base portion onto a plane of said path of movement of said magnetic field is, at least at said transition, surrounded by said path of movement.

34. A device, for use with a closure magazine of a capping machine, for introducing closures into a closure channel from a chamber that accommodates a plurality of said closures, with said closures being crown corks of ferromagnetic material and having a cap-like shape with a closed side and an open side, and with said closures being conducted in said closure channel in a successive manner and in single file, said device further comprising:
  at least one magnetic conveying means that, at least at a transition formed partially in said chamber and partially in an entry region of said closure channel, exerts, via a moving magnetic field, a conveying effect upon said closures in a first conveying direction for introducing said closures into said closure channel, whereby said magnetic field moves along a path of movement that is curved about an axis, and said chamber, at least at said transition, is bounded by at least one first abutment and guide surface against which said open or said closed sides of said closure rest, with said first abutment and guide surface being disposed in a plane that extends perpendicular to said axis of said path of movement of said magnetic field, whereby said plane of said first abutment and guide surface as well as a plane of said path of movement of said magnetic field are disposed at an angle relative to a horizontal direction wherein two closure channels adjoin said chamber, whereby said device has two sets of components that are mirror symmetrical to a central plane that extends between said channels.

35. A device, for use with a closure magazine of a capping machine, for introducing closures into a closure channel from a chamber that accommodates a plurality of said closures, with said closures being crown corks of ferromagnetic material and having a cap-like shape with a closed side and an open side, and with said closures being conducted in said closure channel in a successive manner and in single file, said device further comprising:

at least one magnetic conveying means that, at least at a transition formed partially in said chamber and partially in an entry region of said closure channel, exerts, via a moving magnetic field, a conveying effect upon said closures in a first conveying direction for introducing said closures into said closure channel, whereby said magnetic field moves along a path of movement that is curved about an axis, and said chamber, at least at said transition, is bounded by at least one first abutment and guide surface against which said open or said closed sides of said closure rest, with said first abutment and guide surface being disposed in a plane that extends perpendicular to said axis of said path of movement of said magnetic field, whereby said plane of said first abutment and guide surface as well as a plane of said path of movement of said magnetic field are disposed at an angle relative to a horizontal direction, wherein two closure channels adjoin said chamber, an wherein means are provided for altering said first conveying direction for selectively filling one or the other of said closure channels with said closures via said magnetic conveying means.

36. A device, for use with a closure magazine of a capping machine, for introducing closures into a closure channel from a chamber that accommodates a plurality of said closures, with said closures being crown corks of ferromagnetic material and having a cap-like shape with a closed side and an open side, and with said closures being conducted in said closure channel in a successive manner and in single file, said device further comprising:

at least one magnetic-conveying means that, at least at a transition formed partially in said chamber and partially in an entry region of said closure channel, exerts, via a moving magnetic field, a conveying effect upon said closures in a first conveying direction for introducing said closures into said closure channel, whereby said magnetic field moves along a path of movement that is curved about an axis, and said chamber, at least at said transition, is bounded by at least one first abutment and guide surface against which said open or said closed sides of said closure rest, with said first abutment and guide surface being disposed in a plane that extends perpendicular to said axis of said path of movement of said magnetic field, whereby said plane of said first abutment and guide surface as well as a plane of said path of movement of said magnetic field are disposed at an angle relative to a horizontal direction;

an element that is rotatably driven about said axis of said path of movement of said magnetic field and is in the form of one of the group consisting of disks, rings, wheels, and drums, with said element forming said first abutment and guide surface, and with said element, for providing said magnetic field, carrying at least one magnet, preferably at least one permanent magnet;

at said transition, a guide piece having a guide surface that is disposed in said path of movement of said at least one magnet that carries said closure along, with said guide surface guiding said closures into said closure channel; and means for moving, preferably via a pivoting movement, said guide piece out of an operative position and into a non-operative position.

* * * * *